US012311671B2

(12) United States Patent
Nagashima et al.

(10) Patent No.: US 12,311,671 B2
(45) Date of Patent: May 27, 2025

(54) CARTRIDGE, PRINTING SYSTEM, AND PRINTING APPARATUS

(71) Applicant: Seiko Epson Corporation, Tokyo (JP)

(72) Inventors: Takumi Nagashima, Matsumoto (JP); Yoshihiro Koizumi, Shiojiri (JP); Shun Oya, Kiso-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 191 days.

(21) Appl. No.: 18/025,811

(22) PCT Filed: Sep. 16, 2021

(86) PCT No.: PCT/JP2021/034178

§ 371 (c)(1),
(2) Date: Mar. 10, 2023

(87) PCT Pub. No.: WO2022/065203

PCT Pub. Date: Mar. 31, 2022

(65) Prior Publication Data

US 2023/0347653 A1 Nov. 2, 2023

(30) Foreign Application Priority Data

Sep. 25, 2020 (JP) ................................ 2020-160611

(51) Int. Cl.
*B41J 2/175* (2006.01)

(52) U.S. Cl.
CPC ....... *B41J 2/17523* (2013.01); *B41J 2/17553* (2013.01)

(58) Field of Classification Search
CPC .......................... B41J 2/17523; B41J 2/17553
See application file for complete search history.

(56) References Cited

U.S. PATENT DOCUMENTS

| | | | |
|---|---|---|---|
| 8,646,889 | B2 | 2/2014 | Aoki et al. |
| 8,931,887 | B2 | 1/2015 | Aoki et al. |
| 8,955,951 | B2 | 2/2015 | Aoki et al. |
| 8,960,871 | B2 | 2/2015 | Karasawa et al. |
| 9,004,659 | B2 | 4/2015 | Aoki et al. |
| 9,108,417 | B2 | 8/2015 | Aoki et al. |
| 9,266,337 | B2 | 2/2016 | Aoki et al. |
| 9,440,755 | B2 | 9/2016 | Aoki et al. |

(Continued)

FOREIGN PATENT DOCUMENTS

| | | | |
|---|---|---|---|
| JP | 2002-292905 | A | 10/2002 |
| JP | 2006-43922 | A | 2/2006 |

(Continued)

OTHER PUBLICATIONS

Nov. 30, 2021 International Search Report Issued in International Patent Application No. PCT/JP2021/034178.

*Primary Examiner* — Sharon Polk
(74) *Attorney, Agent, or Firm* — Oliff PLC

(57) ABSTRACT

An amount of liquid that will be left in a cartridge without being consumed is reduced. The cartridge includes a liquid containing portion that contains the liquid; a front wall that is located on an insertion-direction side, an insertion direction being a direction of being inserted into the cartridge mounting portion; and a bottom wall that intersects the front wall and in which a liquid supply portion configured to be coupled to the liquid inlet portion is disposed.

10 Claims, 24 Drawing Sheets

(56) References Cited

U.S. PATENT DOCUMENTS

| | | | |
|---|---|---|---|
| 9,821,557 | B2 | 11/2017 | Aoki et al. |
| 2002/0118262 | A1 | 8/2002 | Seino et al. |
| 2012/0056921 | A1 | 3/2012 | Nakano et al. |
| 2018/0043692 | A1 | 2/2018 | Aoki et al. |
| 2020/0189284 | A1 | 6/2020 | Aoki et al. |

FOREIGN PATENT DOCUMENTS

| | | | | |
|---|---|---|---|---|
| JP | 2006-56118 | A | 3/2006 | |
| JP | 2008-87436 | A | 4/2008 | |
| JP | 2012-51310 | A | 3/2012 | |
| JP | 2017-56686 | A | 3/2017 | |
| WO | 2013/105504 | A1 | 7/2013 | |
| WO | WO-2019098287 | A1 * | 5/2019 | .......... B41J 2/17509 |

* cited by examiner

CARTRIDGE, PRINTING SYSTEM, AND PRINTING APPARATUS

TECHNICAL FIELD

The present disclosure relates to a technique regarding a cartridge, a printing system, and a printing apparatus.

BACKGROUND ART

In prior art, with regard to a cartridge configured to be detachably mounted on a printing apparatus, a technique of disposing a liquid supply portion in a front wall located on an insertion-direction side, an insertion direction being a direction in which the cartridge is inserted into the printing apparatus, is known (PTL 1).

CITATION LIST

Patent Literature

PTL 1: International Publication No. WO 2013/105504

SUMMARY OF INVENTION

Technical Problem

In the technique according to prior art, since the liquid supply portion is disposed in the front wall, it could happen that the liquid contained in the cartridge cannot be supplied to the printing apparatus via the liquid supply portion smoothly. In this case, there is a possibility that an amount of liquid left in the cartridge without being consumed will be large.

Solution to Problem

According to a first aspect of the present disclosure, there is provided a cartridge configured to be mounted into a cartridge mounting portion of a printing apparatus having a liquid inlet portion configured to receive a liquid. The cartridge includes a liquid containing portion that contains the liquid; a front wall that is located on an insertion-direction side, an insertion direction being a direction of being inserted into the cartridge mounting portion; and a bottom wall that intersects the front wall and in which a liquid supply portion configured to be coupled to the liquid inlet portion is disposed.

According to a second aspect of the present disclosure, there is provided a printing system. The printing system includes: a printing apparatus that includes a cartridge mounting portion into which a cartridge is mounted; and the cartridge of the above aspect.

According to a third aspect of the present disclosure, there is provided a printing apparatus. The printing apparatus includes: a cartridge mounting portion into which the cartridge of the above aspect is mounted, wherein the cartridge mounting portion includes an accommodation space into which the cartridge is inserted in an insertion direction and which accommodates the cartridge, and a liquid inlet portion that extends in a direction intersecting the insertion direction and is coupled to a liquid supply portion of the cartridge.

DESCRIPTION OF EMBODIMENTS

A. Embodiment

A-1. Configuration of Printing System

Figure 1:
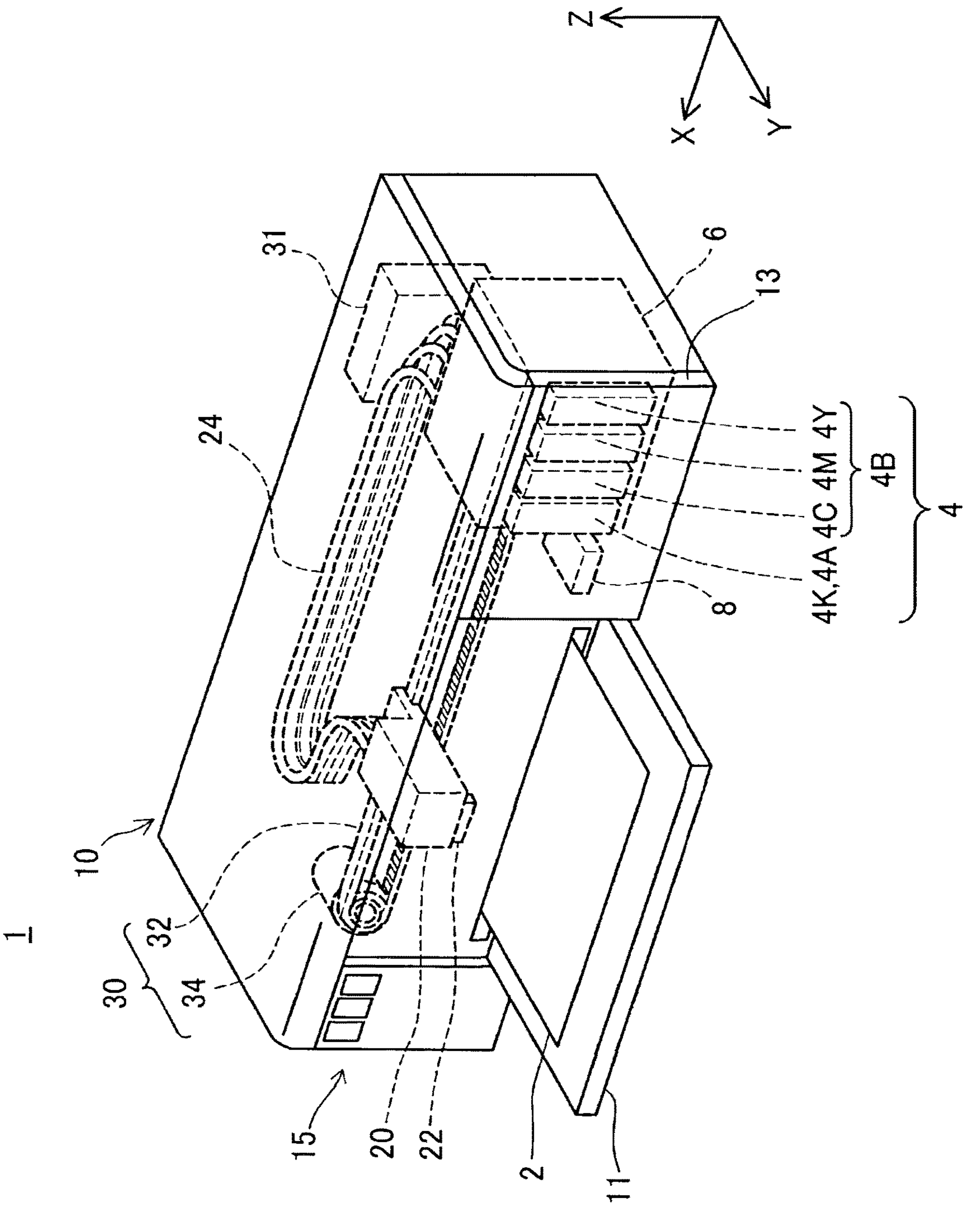
FIG. 1 is a perspective view illustrating a configuration of a printing system according to an embodiment of the present disclosure.

FIG. 1 is a perspective view illustrating a configuration of a printing system 1 according to an embodiment of the present disclosure. In FIG. 1, X, Y, and Z axes, which are three spatial axes orthogonal to one another, are drawn. Directions in which arrows of the X axis, the Y axis, and the Z axis are headed show positive directions along the X axis, the Y axis, and the Z axis, respectively. The positive directions along the X axis, the Y axis, and the Z axis will be denoted as a +X direction, a +Y direction, and a +Z direction, respectively. Directions that are the opposite of the directions in which the arrows of the X axis, the Y axis, and the Z axis are headed are negative directions along the X axis, the Y axis, and the Z axis, respectively. The negative directions along the X axis, the Y axis, and the Z axis will be denoted as a −X direction, a −Y direction, and a −Z direction, respectively. When no distinction is made between positive and negative directions, the directions along the X axis, the Y axis, and the Z axis will be referred to as an X direction, a Y direction, and a Z direction, respectively. The same applies to the subsequent drawings and the description given below.

The printing system 1 includes a printing apparatus 10, and a cartridge 4 from which ink that is a liquid is supplied to the printing apparatus 10.

The printing apparatus 10 according to the present embodiment is an ink-jet printer that ejects ink from an ejection head 22. The printing apparatus 10 is a large printer that performs printing on large-sized sheets (A2 to A0 and the like) such as a poster. The printing apparatus 10 includes a cartridge mounting portion 6, a control unit 31, a carriage 20, the ejection head 22, and a drive mechanism 30. In addition, the printing apparatus 10 includes operation buttons 15 for a user to operate the printing apparatus 10.

A plurality of cartridges 4 are detachably mounted into the cartridge mounting portion 6 independently of one another. In the present embodiment, four types of cartridges 4 corresponding to ink of four colors of black, yellow, magenta, and cyan, that is, four cartridges 4 in total, are mounted into the cartridge mounting portion 6. The cartridge 4 containing black ink is also referred to as a cartridge 4K. The cartridge 4 containing yellow ink is also referred to as a cartridge 4Y. The cartridge 4 containing magenta ink is also referred to as a cartridge 4M. The cartridge containing cyan ink is also referred to as a cartridge 4C. In the present embodiment, the cartridge 4K is configured to be able to contain a larger amount of liquid than the cartridges 4C, 4M, and 4Y. Therefore, the cartridge 4K is also referred to as a first type of cartridge 4A, and the cartridges 4C, 4M, and 4Y are also referred to as a second type of cartridge 4B.

The printing apparatus 10 includes a replacement cover 13 on its front on a +Y direction side. When a +Z direction side of the replacement cover 13 is turned toward the near side, which is the +Y direction side, an opening of the cartridge mounting portion 6 appears, and attachment and detachment of the cartridge 4 becomes possible. When the cartridge 4 is mounted in the cartridge mounting portion 6, ink can be supplied to the ejection head 22 provided on the carriage 20 via tubes 24 serving as liquid flow conduits. In the present embodiment, the ink is supplied from the cartridge 4 to the ejection head 22 by utilizing a water head difference. Specifically, the ink is supplied to the ejection head 22 by means of a water head difference between a liquid level of the ink in a liquid reservoir portion 699 and the ejection head 22. Alternatively, in another embodiment, the ink may be supplied to the ejection head 22 by sucking the ink contained in the cartridge 4 by a non-illustrated pump mechanism of the printing apparatus 10. The tubes 24 are provided for the respective types of ink. A state in which the cartridge 4 is mounted in the cartridge mounting portion 6 and the ink as the liquid can be supplied to the printing apparatus 10 is also referred to as a "mounted state".

The ejection head 22 is provided with nozzles for each type of ink. The ejection head 22 ejects the ink from the nozzles toward a printing sheet 2 to print data such as characters or images. The mounting of the cartridge 4 into the cartridge mounting portion 6, and a detailed configuration of the cartridge 4 and the cartridge mounting portion 6, will be described later. In the present embodiment, the printing apparatus 10 is a so-called "off-carriage type" printer, in which the cartridge mounting portion 6 does not move together with the carriage 20. The present disclosure can also be applied to a so-called "on-carriage type" printer, in which the cartridge mounting portion 6 is provided on the carriage 20 and moves together with the carriage 20.

The control unit 31 controls each portion of the printing apparatus 10 and signal interaction with the cartridge 4. The carriage 20 moves the ejection head 22 relative to the printing sheet 2.

The drive mechanism 30 reciprocates the carriage based on a control signal from the control unit 31. The drive mechanism 30 includes a timing belt 32 and a drive motor 34. Driven by power of the drive motor 34 transmitted to the carriage 20 via the timing belt 32, the carriage 20 reciprocates in a main-scanning direction, which is a direction along the X direction. The printing apparatus 10 includes a transport mechanism for moving the printing sheet 2 in a sub-scanning direction, which is the +Y direction. When printing is performed, the printing sheet 2 is moved in the sub-scanning direction by the transport mechanism, and the printing sheet 2 after completion of printing is outputted onto a front cover 11.

There is an area called as a home position at a location outside a printing area where the carriage 20 is moved in the main-scanning direction. A maintenance mechanism that performs maintenance for proper print execution is mounted at the home position. The maintenance mechanism includes: a cap member 8 that is pushed against a surface, on which the nozzles are formed, on a bottom-surface side of the ejection head 22 to form a closed space in such a way as to surround the nozzles, an elevating-and-lowering mechanism (not illustrated) that elevates and lowers the cap member 8 in order to push the cap member 8 against the nozzle surface of the ejection head 22, a suction pump (not illustrated) that introduces a negative pressure into the closed space formed by the cap member 8 being pushed against the nozzle surface of the ejection head 22, and the like.

In the present embodiment, in a use state of the printing system 1, an axis along the sub-scanning direction in which the printing sheet 2 is transported is the Y axis, an axis along a gravity direction is the Z axis, and an axis along a moving direction of the carriage 20 is the X axis. Here, the "use state of the printing system 1" refers to a state in which the printing system 1 is installed on a horizontal plane. In the present embodiment, the sub-scanning direction is the +Y direction, the direction that is the opposite thereof is the −Y direction, the gravity direction is the −Z direction, and the direction that is the opposite of the gravity direction is the +Z direction. The X direction and the Y direction are directions going horizontally. When the printing system 1 is viewed from the front side, the direction going from the right side to the left side is the +X direction, and the direction that is the opposite thereof is the −X direction. In the present embodiment, the direction in which the cartridge 4 is inserted into the cartridge mounting portion 6 for mounting is the −Y direction, and the direction in which the cartridge 4 is removed from the cartridge mounting portion 6 is the +Y direction. Therefore, the −Y direction side of the cartridge mounting portion 6 is also referred to as a far side, and a +Y direction side of the cartridge mounting portion 6 is also referred to as a near side. In the present embodiment, the direction in which the plurality of cartridges 4 are arranged is the X direction.

A-2. Schematic Configuration of Mounted State of Cartridge 4

Figure 2:
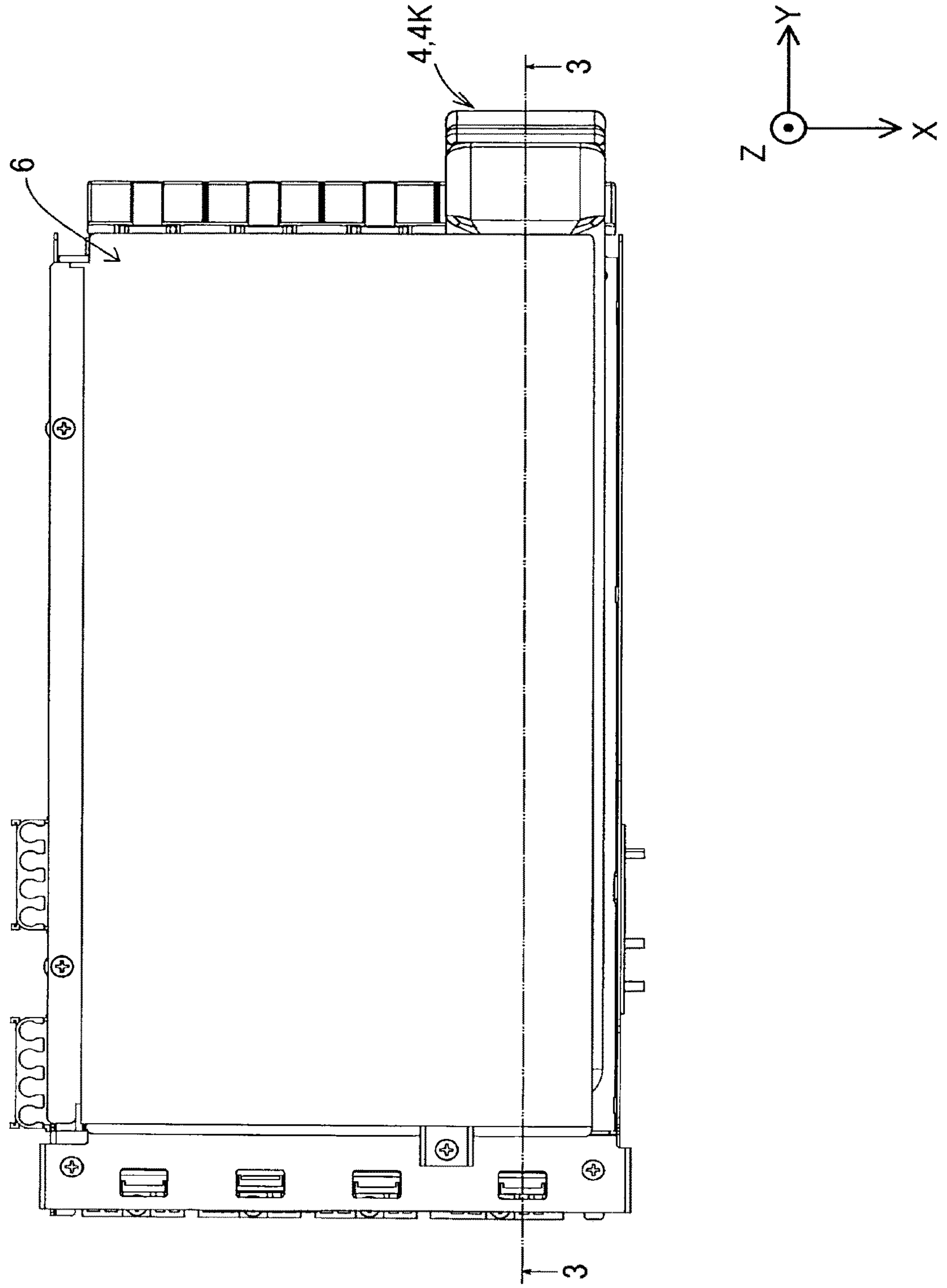
FIG. 2 is a view of a cartridge mounting portion when viewed from the +Z direction side.
Figure 3:
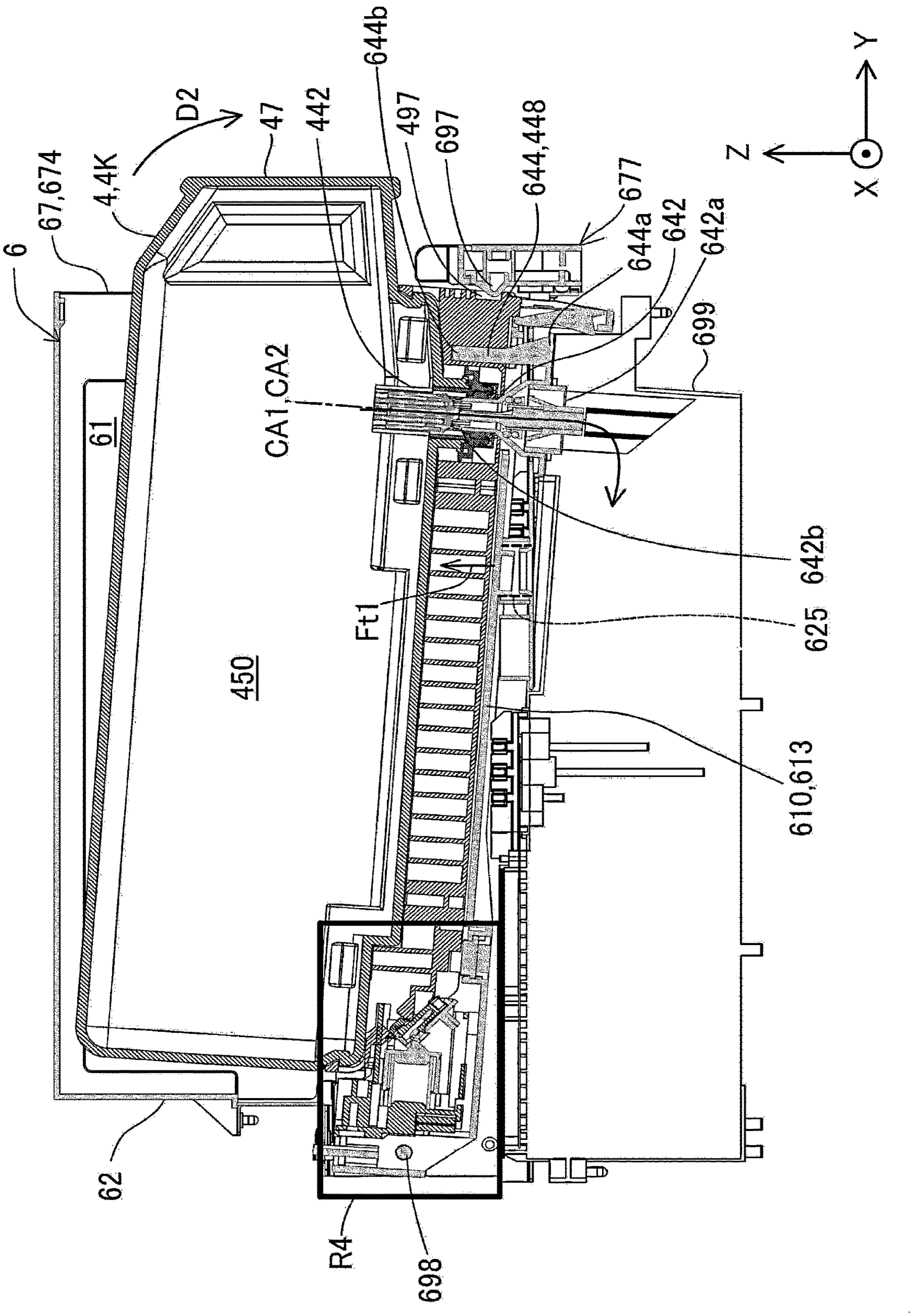
FIG. 3 is a sectional view taken along the line 3-3 of FIG. 2.
Figure 4:
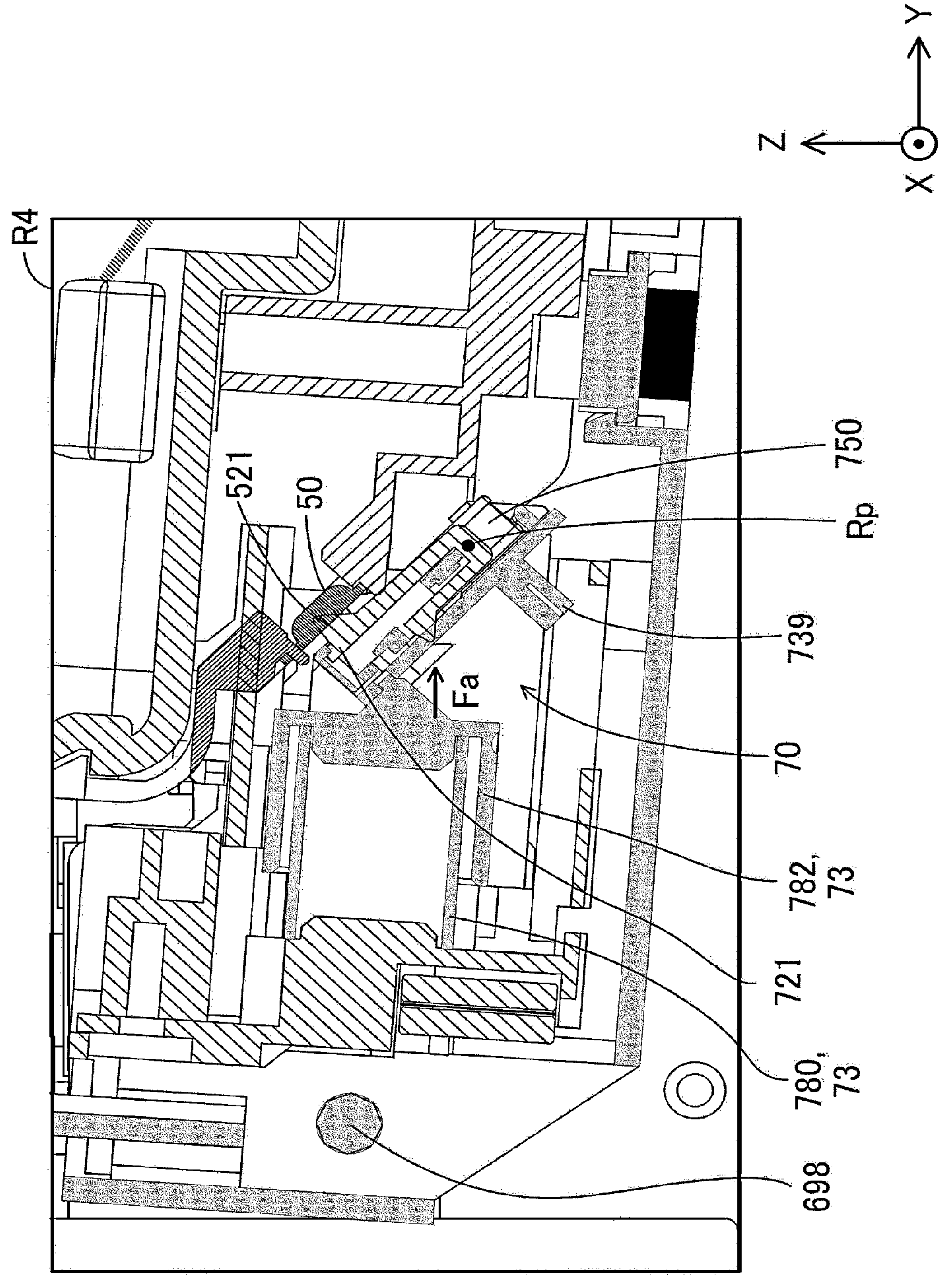
FIG. 4 is an enlarged view of a region R4 of FIG. 3.

FIG. 2 is a view of the cartridge mounting portion 6 when viewed from the +Z direction side. FIG. 3 is a sectional view taken along the line 3-3 of FIG. 2. FIG. 4 is an enlarged view of a region R4 of FIG. 3. In FIG. 2, the cartridge 4K is mounted in the cartridge mounting portion 6. A mounting process and a schematic configuration of a mounted state of the cartridge 4 will now be described with reference to FIGS. 2 to 4. The mounting process and mounted state are the same for the cartridges 4C, 4M, 4Y, and 4K.

As illustrated in FIG. 3, the cartridge 4 is inserted in the insertion direction and is inserted into an accommodation space 61 of the cartridge mounting portion 6 through an insertion/removal opening 674 which a first apparatus wall 67 of the cartridge mounting portion 6 has. As a result, the accommodation space 61 accommodates the cartridge 4. The insertion/removal opening 674 is an entrance/exit into/out of the accommodation space 61 of the cartridge 4. In a state in which the cartridge 4 is inserted in the accommodation space 61 of the cartridge mounting portion 6, the cartridge 4 is supported from a −z direction side by a support member 610 of the cartridge mounting portion 6. In addition, in the mounted state, in which the cartridge 4 is mounted in the accommodation space 61 of the cartridge mounting portion 6, a liquid supply portion 442 of the cartridge 4 and a liquid inlet portion 642 of the cartridge mounting portion 6 are coupled to each other. As a result, the ink contained in a liquid containing portion 450 of the cartridge 4 is supplied to the liquid inlet portion 642 via the liquid supply portion 442. In the present embodiment, the ink is supplied from the liquid supply portion 442 to the liquid inlet portion 642, and, on the other hand, air contained in the liquid reservoir portion 699 flows, as air bubbles, through the liquid inlet portion 642 and the liquid supply portion 442 to the liquid containing portion 450. As a result, gas-liquid exchange in the liquid containing portion 450 is performed. In another embodiment, the cartridge 4 may have an atmospheric communication passage communicating the liquid containing portion 450 with the outside, and gas-liquid exchange may be performed through the atmospheric communication passage. The atmospheric communication passage is disposed at a location different from that of the liquid supply portion 442 and is formed, for example, in a wall forming the liquid containing portion 450.

The liquid inlet portion 642 receives the liquid supplied from the cartridge 4. The liquid inlet portion 642 is a cylindrical member and has an internal flow passage for making the liquid flow therein. The liquid inlet portion 642 has a base end portion 642*a* and a tip portion 642*b*. An opening communicating with the internal flow passage is formed in the tip portion 642*b*. The ink of the liquid supply portion 442 flows to the internal flow passage through this opening. The base end portion 642*a* is connected to the liquid reservoir portion 699 and allows the ink that has flowed through the internal flow passage flow to flow into the liquid reservoir portion 699. The liquid reservoir portion 699 is located on a −Z direction side of the accommodation space 61. The liquid reservoir portion 699 communicates with the ejection head 22 via the tube 24 illustrated in FIG. 1. As described above, the liquid inlet portion 642 communicates with the ejection head 22 via the liquid reservoir portion 699 and the tube 24. A central axis CA1 of the liquid inlet portion 642 is parallel to a central axis CA2 of the liquid supply portion 442 in the mounted state and is inclined with respect to the Z direction. That is, a direction along the central axis CA1, which is a direction in which the liquid inlet portion 642 extends, intersects the insertion direction of the cartridge 4. A direction along the central axis CA2 of the liquid supply portion 442 is a direction in which the liquid supply portion 442 extends.

As illustrated in FIG. 4, in the mounted state of the cartridge 4, a circuit board 50 of the cartridge 4 and an apparatus-side terminal portion 70 of the cartridge mounting portion 6 are electrically connected to each other by being in contact with each other. The apparatus-side terminal portion 70 is held by a holding mechanism 73. The apparatus-side terminal portion 70 includes a plurality of apparatus-side terminals 721, a terminal holding portion 750, and a connector 739.

In the present embodiment, the number of the plurality of apparatus-side terminals 721 provided is nine. Each of the plurality of apparatus-side terminals 721 is a conductive metal plate member. The apparatus-side terminal 721 has a terminal rotation fulcrum Rp. Its portion in contact with a cartridge side terminal 521 of the circuit board 50, which is an end portion, can be elastically deformed using the terminal rotation fulcrum Rp as a fulcrum. The direction in which the portion is elastically deformed is a direction along the Y direction and the Z direction. The terminal holding portion 750 holds the plurality of apparatus-side terminals 721. The connector 739 is electrically connected to the plurality of apparatus-side terminals 721. In addition, the connector 739 is electrically connected to the control unit 31 of the printing apparatus 10 by wiring that is not illustrated. This connection enables data communication between the circuit board 50 and the control unit 31.

The holding mechanism 73 includes an urging member 780 and an attaching member 782. The urging member 780 is formed of a coil spring. The urging member 780 is disposed at an inner side of the attaching member 782. The apparatus-side terminal portion 70 is attached to the attaching member 782. The urging member 780 is in a compressed state when the insertion of the cartridge 4 into the cartridge mounting portion 6 has completed. Because of this compression, the urging member 780 applies, to the apparatus-side terminal portion 70 via the attaching member 782, an external force Fa acting in a direction toward a removal-direction side of the cartridge 4, which is toward the first apparatus wall 67. Since the apparatus-side terminal portion 70 is pushed against the circuit board 50 by the external force Fa, good contact between the apparatus-side terminals 721 and the cartridge-side terminals 521 is maintained.

As described above, the holding mechanism 73 holds the apparatus-side terminal portion 70 such that the apparatus-side terminal portion 70 is displaceable in a direction along the insertion direction of the cartridge 4. In addition, one end portion of the urging member 780 on the side where the apparatus-side terminal portion 70 is located is configured to be slightly movable in the X direction and the Z direction intersecting the insertion direction. Because of this configuration, the apparatus-side terminal portion 70 is held by the holding mechanism 73 in such a way as to be slightly movable in the X direction and the Z direction intersecting the insertion direction.

A mounting process of mounting the cartridge 4 into the cartridge mounting portion 6 includes a terminal connection process and a supply portion coupling process executed after the terminal connection process. The terminal connection process is a process of bringing the apparatus-side terminals 721 and the cartridge-side terminals 521 into contact with each other and thus establishing an electric connection therebetween by moving the cartridge 4 in the −Y direction to insert the cartridge 4 into the accommodation space 61 of the cartridge mounting portion 6 through the insertion/removal opening 674 of the first apparatus wall 67. The supply portion coupling process is a process of coupling the liquid inlet portion 642 and the liquid supply portion 442 to each other by rotationally moving a rear-surface 47 side of the cartridge 4 in a coupling direction D2, which is indicated by an arrow, while maintaining the electric connection between the apparatus-side terminals 721 and the cartridge-side terminals 521 as illustrated in FIG. 3, around a rotation fulcrum 698 serving as a displacement mechanism included in the support member 610. The rotation fulcrum 698 is provided on the side where a second apparatus wall 62 of the cartridge mounting portion 6 is located.

In the supply portion coupling process, an apparatus-side supply portion positioning portion 644, which is a projection included in the cartridge mounting portion 6, enters a supply portion positioning portion 448, which is included in the cartridge 4 and having a recessed shape, so as to restrict the movement of the liquid supply portion 442 in a direction intersecting with the central axis CA2 of the liquid supply portion 442. As a result, positioning of the liquid supply portion 442 with respect to the liquid inlet portion 642 is performed. The apparatus-side supply portion positioning portion 644 has a substantially rectangular parallelepiped shape. The apparatus-side supply portion positioning portion 644 has one end portion 644*a* and the other end portion 644*b*. The one end portion 644*a* is located on the side where the liquid reservoir portion 699 is located. The one end portion 644*a* is located closer to the accommodation space 61 than the other end portion 644*b* is.

In the mounted state of the cartridge 4, a main wall 613 forming a bottom portion of the support member 610 is inclined with respect to the Y direction. Specifically, the main wall 613 of the support member 610 is inclined such that it is located closer to the −Z direction side, which is a lower side, as it extends toward a +Y-axis direction. The main wall 613 is parallel to the Y direction in an initial arrangement state of the cartridge mounting portion 6 to which the cartridges 4 are not mounted.

The cartridge mounting portion 6 includes an apparatus urging member 625 that applies an external force Ft1 to the support member 610 in order to return the support member 610 to its position of the initial arrangement state in the mounted state of the cartridge 4. The apparatus urging member 625 is a coil spring that is provided between the support member 610 and the liquid reservoir portion 699 and is in a compressed state in the mounted state. The apparatus urging member 625 that is in the compressed state applies the external force Ft1 having a +Z direction component to the support member 610. On the other hand, in the mounted state of the cartridge 4, a cartridge engaging portion 497 of the cartridge 4 engages with a mounting engaging portion 697 of the cartridge mounting portion 6, so that the mounted state is maintained. The mounting engaging portion 697 is formed on an engagement forming body 677 of the cartridge mounting portion 6.

A-3. Detailed Configuration of Cartridge Mounting Portion 6

Figure 5:
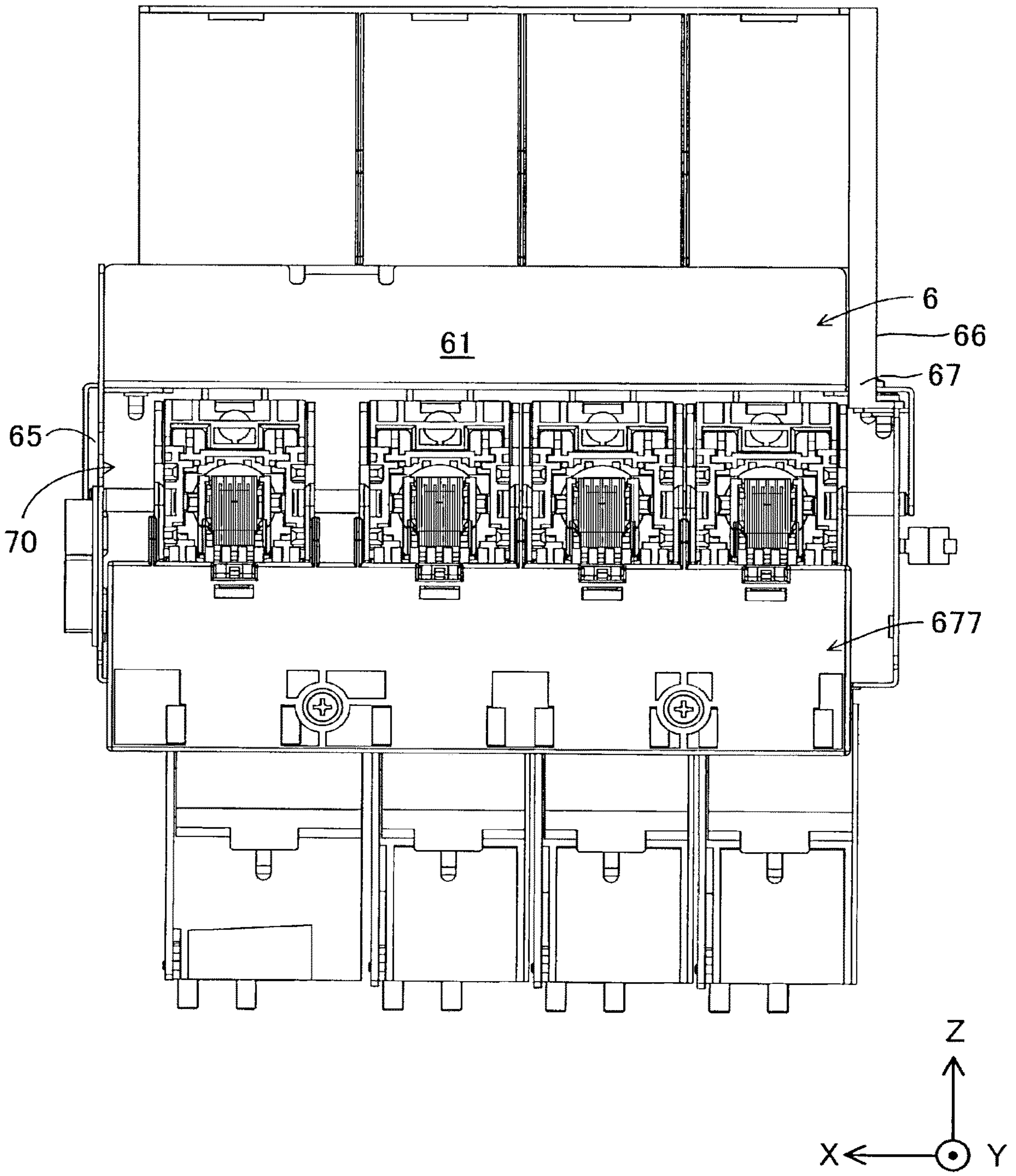
FIG. 5 is a view of the cartridge mounting portion when viewed from the +Y direction side.
Figure 6:
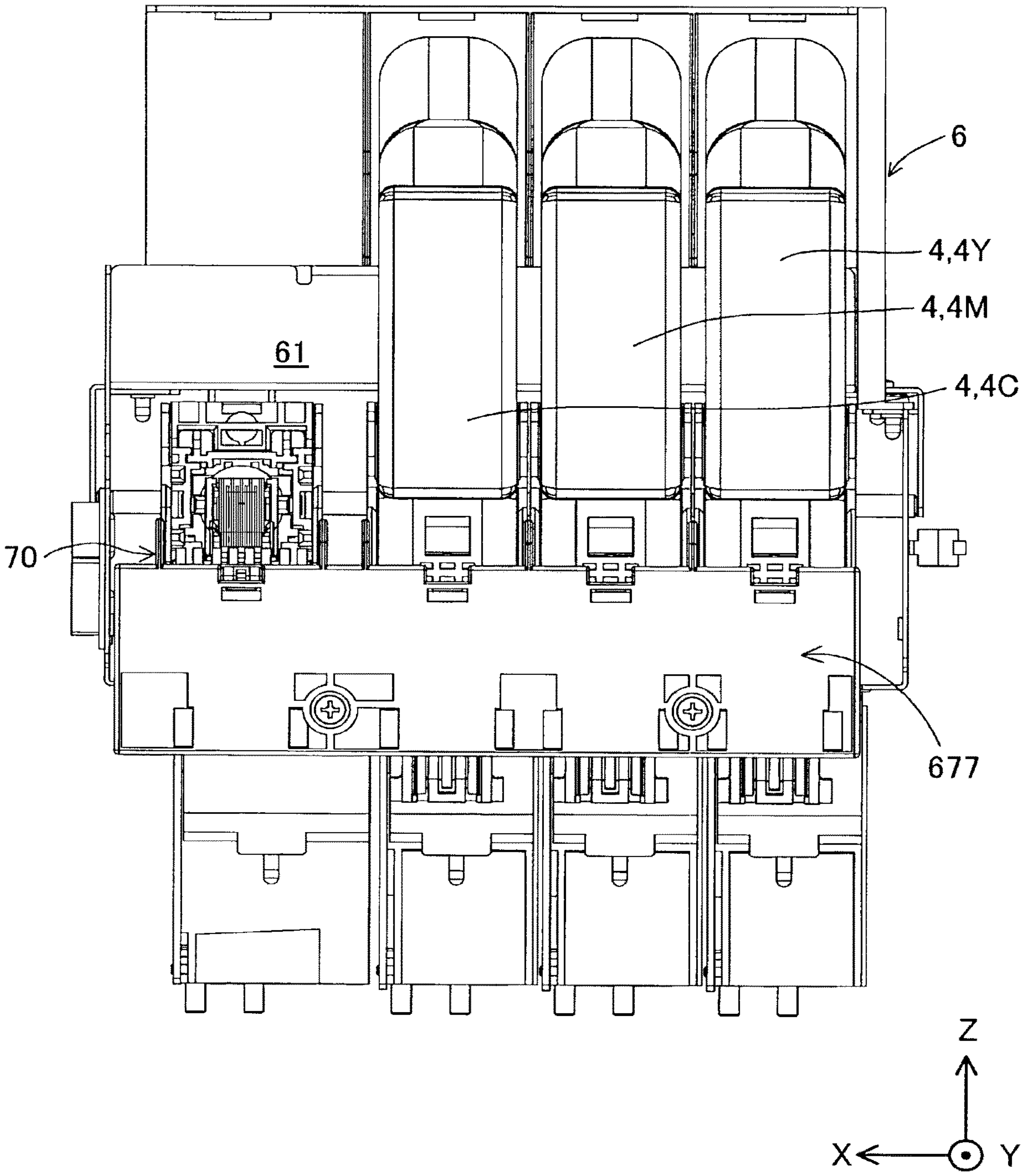
FIG. 6 is a view illustrating that cartridges are mounted in the cartridge mounting portion.
Figure 7:
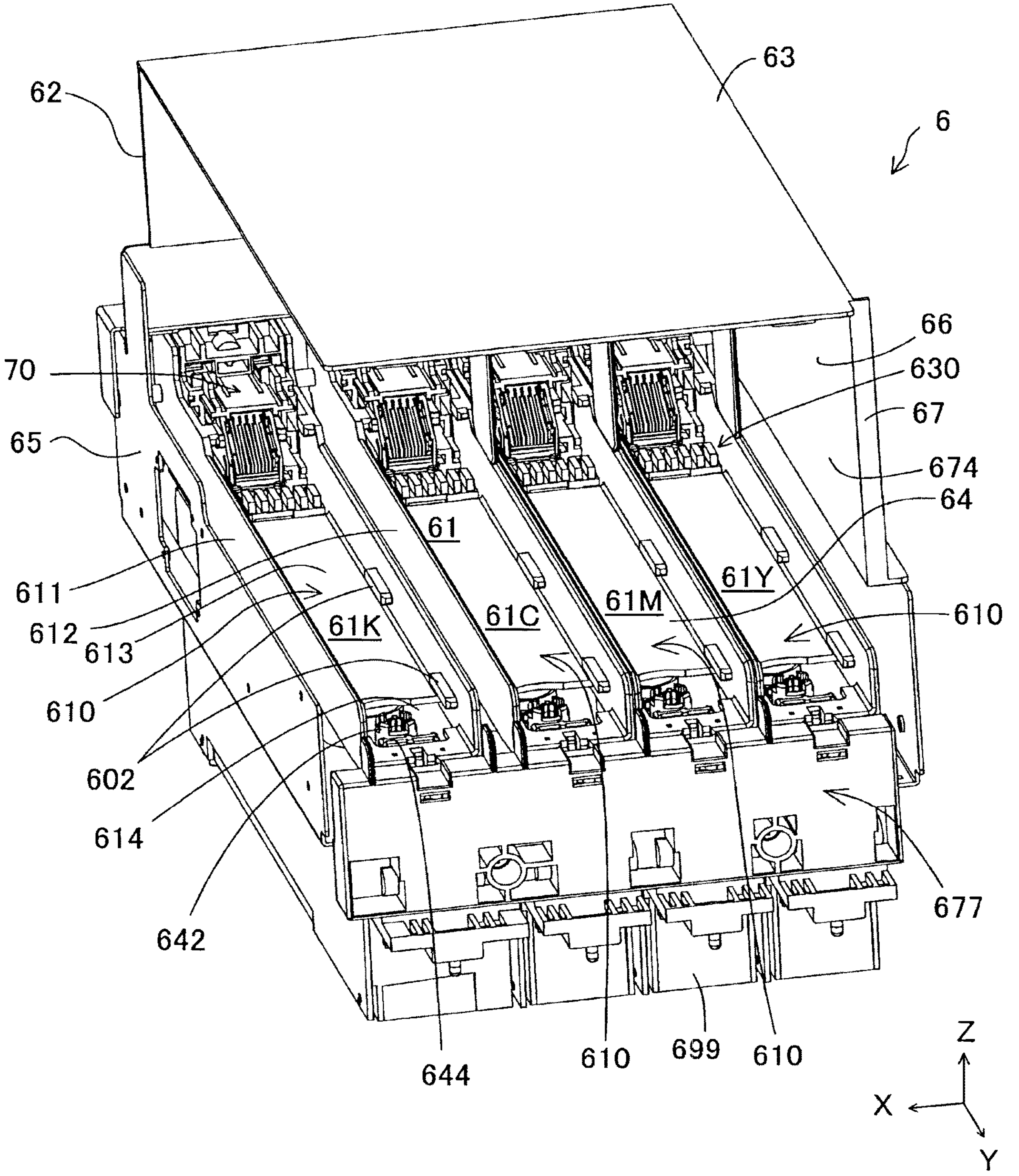
FIG. 7 is a perspective view of the cartridge mounting portion.
Figure 8:
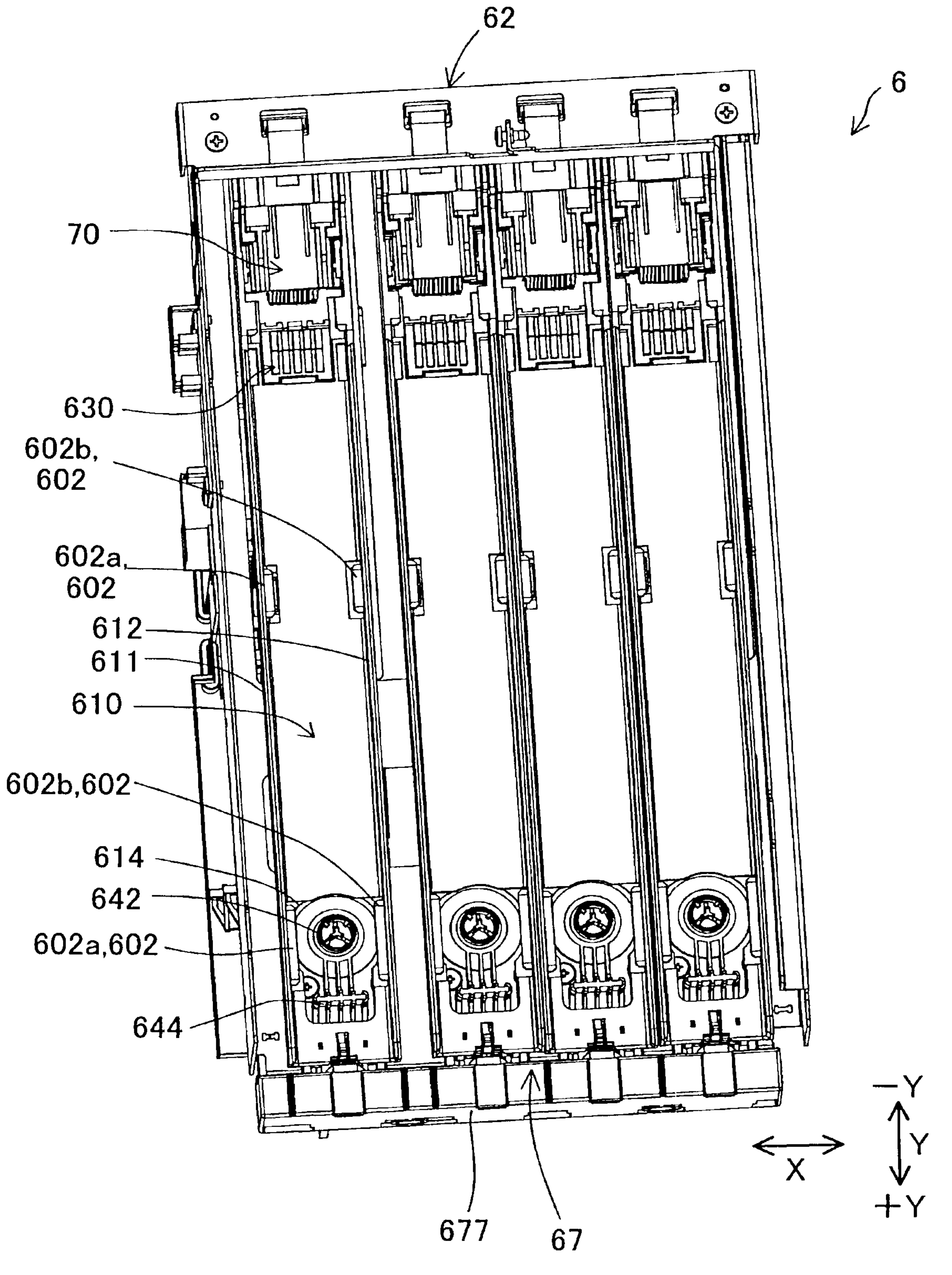
FIG. 8 is a view of the cartridge mounting portion when viewed from the +Z direction side.
Figure 9:
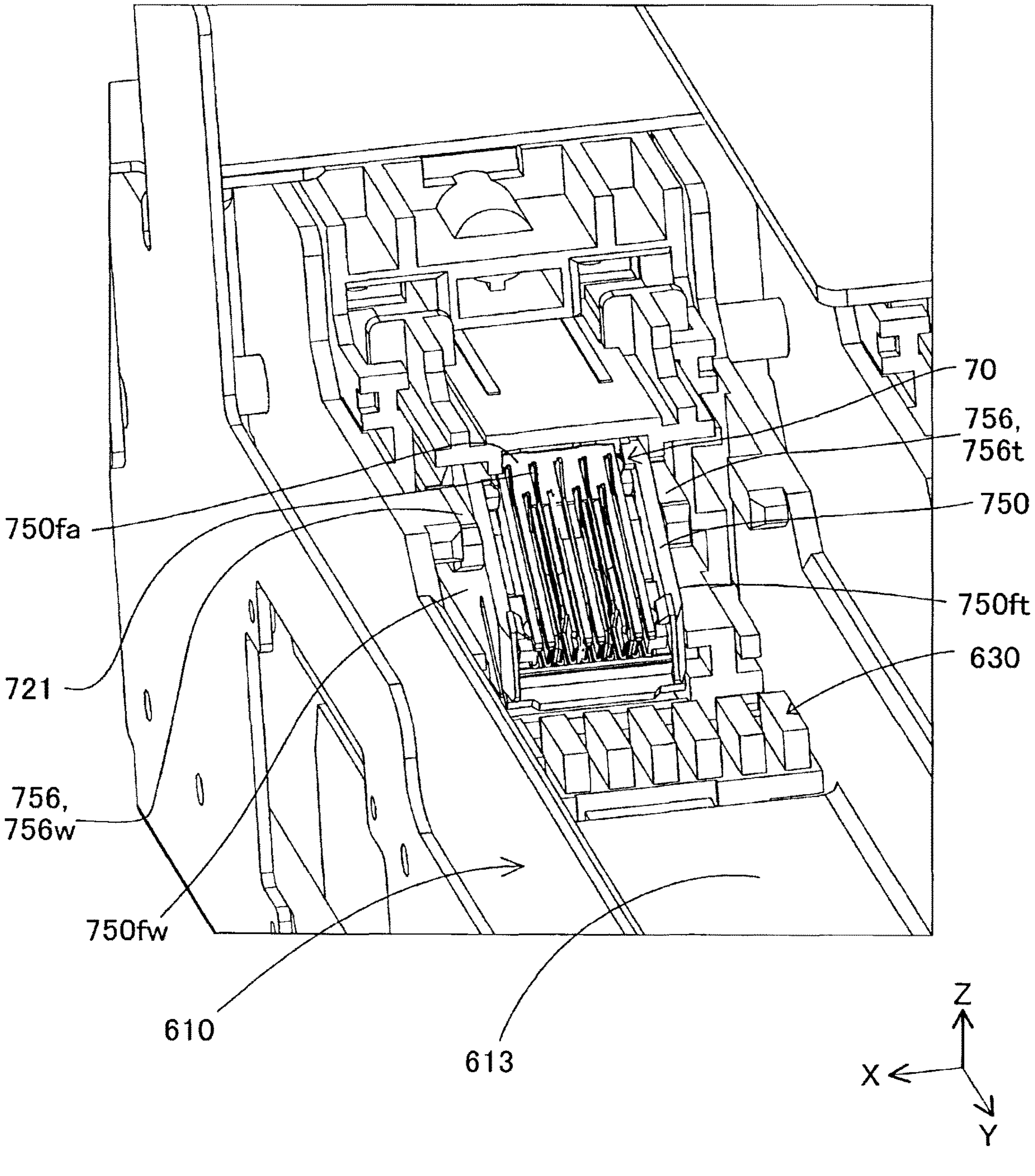
FIG. 9 is a partially enlarged view of the cartridge mounting portion.
Figure 10:
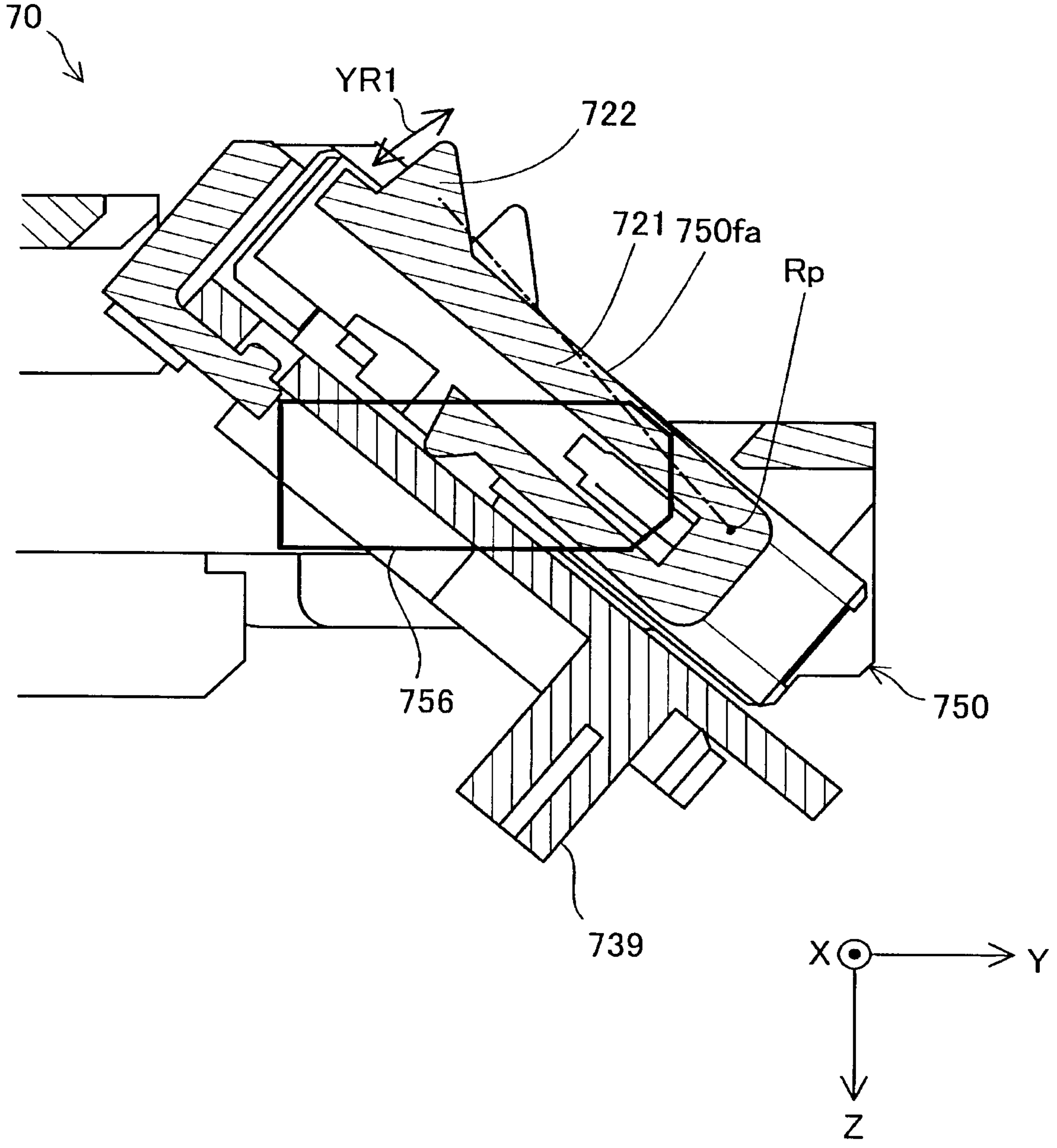
FIG. 10 is a schematic sectional view of an apparatus-side terminal portion.

FIG. 5 is a view of the cartridge mounting portion 6 when viewed from the +Y direction side. FIG. 6 is a view illustrating that the cartridges 4 are mounted in the cartridge mounting portion 6. FIG. 7 is a perspective view of the cartridge mounting portion 6. FIG. 8 is a view of the cartridge mounting portion 6 when viewed from the +Z direction side. FIG. 9 is a partially enlarged view of the cartridge mounting portion 6. FIG. 10 is a schematic sectional view of the apparatus-side terminal portion 70. In FIGS. 6 to 10, in order to facilitate understanding, the illustration of some of the components of the cartridge mounting portion 6 is omitted. Regarding the cartridge mounting portion 6, the X direction is also referred to as a width direction, the Y direction is also referred to as a depth direction, and the Z direction is also referred to as a height direction. In the description below, unless there is a particular mention of a state, each element will be described on the premise of the cartridge mounting portion 6 in the initial arrangement state in which no cartridge 4 is mounted in the cartridge mounting portion 6.

As illustrated in FIGS. 5 to 7, in the cartridge mounting portion 6, the accommodation space 61 in which the cartridges 4 are to be accommodated is formed. The accommodation space 61 has a substantially rectangular parallelepiped shape. Broadly speaking, slots 61C, 61M, 61Y, and 61K, which are portions of the accommodation space 61 for accommodating the respective cartridges 4C, 4M, 4Y, and 4K, correspond to appearance shapes of the respective cartridges 4C, 4M, 4Y, and 4K. In the present embodiment, the cartridge 4K has a greater dimension in the X direction than the other cartridges 4C, 4M, and 4Y in order to increase an amount of liquid to be contained. Therefore, in the present embodiment, a width of the slot 61K is greater than that of the other slots 61C, 61M, and 61Y.

As illustrated in FIG. 7, the cartridge mounting portion 6 has six apparatus walls 62, 63, 64, 65, 66, and 67 forming the accommodation space 61. In the present disclosure, the concept of the term "wall" includes not only a single wall but also a wall composed of a plurality of walls. The second apparatus wall 62 forms a wall of the accommodation space 61 on the −Y direction side. The second apparatus wall 62 is a substantially vertical wall in a use state of the printing apparatus 10.

The first apparatus wall 67 faces the second apparatus wall 62 in the Y direction. In the first apparatus wall 67, the insertion/removal opening 674, through which the cartridge 4 passes when inserted into or removed from the accommodation space 61, is formed.

An apparatus top wall 63 forms a wall of the accommodation space 61 on the +Z direction side. An apparatus bottom wall 64 faces the apparatus top wall 63 in the Z direction and forms a wall of the accommodation space 61 on the −Z direction side. The apparatus bottom wall 64 is formed by the support member 610. The apparatus bottom wall 64 has a plurality of openings 614. In the present embodiment, four openings 614 corresponding to the slots 61C, 61M, 61Y, and 61K are formed. The apparatus top wall 63 and the apparatus bottom wall 64 intersect the second apparatus wall 62 and the first apparatus wall 67. In the present disclosure, the term "cross" or "intersect" means any one of (i) a state in which two elements intersect and actually cross each other, (ii) a state in which one element would cross the other element if the one element were extended, and (iii) a state in which mutual elements, if they were extended respectively, would cross each other.

A first apparatus sidewall 65 forms a wall of the accommodation space 61 on the +X direction side. A second apparatus sidewall 66 faces the first apparatus sidewall 65 in the X direction and forms a wall of the accommodation space 61 on the −X direction side. The first apparatus sidewall 65 and the second apparatus sidewall 66 intersect the second apparatus wall 62, the first apparatus wall 67, the apparatus top wall 63, and the apparatus bottom wall 64.

As illustrated in FIGS. 7 and 8, the cartridge mounting portion 6 further includes the support member 610, the liquid inlet portion 642, the supply portion positioning portion 644, apparatus guide portions 602, and the engagement forming body 677. A plurality of support members 610 whose number corresponds to the number of cartridges 4 to be mounted are provided. In the present embodiment, four support members 610 are provided. The support member 610 forms the apparatus bottom wall 64 of the accommodation space 61 on a gravity direction side. The support member 610 supports the cartridge 4 from the −Z direction side, which is the gravity direction side. The support member 610 is a member extending along the Y direction. The support member 610 has a recessed shape. The support member 610 has the main wall 613 forming the apparatus bottom wall 64, a first support sidewall 611, and a second support sidewall 612.

The main wall 613 forms a bottom portion located on the gravity direction side and having a recessed shape. The openings 614 are formed at the end of the main wall 613 on the side where the first apparatus wall 67 is located. The openings 614 penetrate through the main wall 613 in a thickness direction of the main wall 613.

As illustrated in FIG. 7, the first support sidewall 611 rises from a +X-direction-side end portion of the main wall 613 in the +Z direction, which is the direction that is the opposite of the gravity direction. The second support sidewall 612 rises from a −X-direction-side end portion of the main wall 613 in the +Z direction. The first support sidewall 611 and the second support sidewall 612 face each other in the X direction.

The apparatus guide portions 602 guide the cartridge 4 in the insertion direction and the removal direction. The apparatus guide portions 602 are provided for each support member 610. The apparatus guide portions 602 are provided on each of the first support sidewall 611 and the second support sidewall 612. The apparatus guide portions 602 are projections provided on the first support sidewall 611 and the second support sidewall 612. As illustrated in FIG. 8, a first apparatus guide portion 602*a* provided on the first support sidewall 611 is a projection protruding from the first support sidewall 611 toward the second support sidewall 612. The first apparatus guide portion 602*a* extends along the Y direction. A plurality of first apparatus guide portions 602*a* are arranged at intervals in the Y direction. A second apparatus guide portion 602*b* provided on the second support sidewall 612 is a projection protruding from the second support sidewall 612 toward the first support sidewall 611. The second apparatus guide portion 602*b* extends along the Y direction. A plurality of second apparatus guide portions 602*b* are arranged at intervals in the Y direction.

As illustrated in FIGS. 7 and 8, the liquid inlet portion 642 receives the liquid of the cartridge 4. In the initial arrangement state of the cartridge mounting portion 6, the liquid inlet portion 642 is not located in the accommodation space 61, but is located on the −Z direction side with respect to the accommodation space 61. That is, the liquid inlet portion 642 is located on an opposite side away from the accommodation space 61, with the support member 610 interposed therebetween. Therefore, when the cartridge 4 is inserted into the accommodation space 61 of the cartridge mounting portion 6, it is possible to prevent the cartridge 4 from colliding with the liquid inlet portion 642. As described above, as illustrated in FIG. 3, the tip portion 642*b* of the liquid inlet portion 642 is put into the accommodation space 61 by rotationally moving the support member 610 around the rotation fulcrum 698 in the coupling direction D2 to lower the opening 614. That is, the rotation fulcrum 698 as the displacement mechanism puts the tip portion 642*b* of the liquid inlet portion 642 into the accommodation space 61 through the opening 614 by letting the support member 610 move rotationally to cause displacement of the opening 614 toward the gravity-direction side.

The apparatus-side supply portion positioning portion 644 illustrated in FIG. 7 is received by the supply portion positioning portion 448 so as to restrict the movement of the liquid supply portion 442 with respect to the liquid inlet portion 642. As a result, positioning of the liquid supply portion 442 is performed. In the initial arrangement state of the cartridge mounting portion 6, the apparatus-side supply portion positioning portion 644 is not located in the accommodation space 61, but is located on the −Z direction side with respect to the accommodation space 61. That is, the apparatus-side supply portion positioning portion 644 is located on an opposite side away from the accommodation space 61, with the support member 610 interposed therebetween. Therefore, when the cartridge 4 is inserted into the accommodation space 61 of the cartridge mounting portion 6, it is possible to prevent the cartridge 4 from colliding with the apparatus-side supply portion positioning portion 644. The other end portion 644*b* of the apparatus-side supply portion positioning portion 644 is put into the accommodation space 61 by rotating the support member 610 around the rotation fulcrum 698 in the coupling direction D2 to lower the opening 614. That is, the rotation fulcrum 698 puts the other end portion 644*b* of the apparatus-side supply portion positioning portion 644 into the accommodation space 61 through the opening 614 by letting the support member 610 rotate to cause displacement of the opening 614.

As illustrated in FIG. 8, the cartridge mounting portion 6 further includes the apparatus-side terminal portion 70 and an apparatus-side identification member 630. As illustrated in FIG. 9, the terminal holding portion 750 included in the apparatus-side terminal portion 70 includes a holding portion surface 750*fa*, on which the apparatus-side terminal 721 is exposed, a first holding portion sidewall 750*ft*, and a second holding portion sidewall 750*fw*. The first holding portion sidewall 750*ft* forms a sidewall of the terminal holding portion 750 on the X direction side. The second holding portion sidewall 750*fw* forms a sidewall of the terminal holding portion 750 on the +X direction side.

As illustrated in FIGS. 8 and 9, the apparatus-side identification members 630 are used for identifying whether or not correct types of cartridges 4C, 4M, 4Y, and 4K have been inserted into the respective slots 61C, 61M, 61Y, and 61K of the accommodation space 61. The apparatus-side identification members 630 form different pattern shapes corresponding to the colors of the liquids contained in the cartridges 4C, 4M, 4Y, and 4K. In FIG. 8, in the respective slots 61C, 61M, 61Y, and 61K, the apparatus-side identification members 630 have the same pattern shape for convenience, but actually have different pattern shapes. The apparatus-side identification member 630 is provided on the main wall 613 of the support member 610.

As illustrated in FIG. 9, the apparatus-side identification member 630 is formed by at least one or more ribs. The pattern shape is determined by the number and locations of ribs. The cartridges 4 are also provided with cartridge-side identification members formed by ribs. The cartridge-side identification members form different pattern shapes corresponding to the types of the cartridge 4, that is, the colors of the liquids contained therein. When a correct type of cartridge 4 is inserted into the corresponding slot 61C to 61K, the apparatus-side identification member 630 and the cartridge-side identification member are fitted into each other without colliding with each other. On the other hand, when a wrong type of cartridge 4 is inserted into the slot 61C to 61K, the apparatus-side identification member 630 and the cartridge-side identification member collide with each other, so that further insertion of the cartridge 4 is hindered. This makes it possible to reduce a possibility that a wrong type of cartridge 4 will be mounted into the slot 61C to 61K of the cartridge mounting portion 6.

As illustrated in FIG. 9, the apparatus-side terminal portion 70 includes an apparatus-side terminal positioning portion 756 in addition to the plurality of apparatus-side terminals 721, the terminal holding portion 750, and the connector 739 described above. The apparatus-side terminal positioning portion 756 is received by a terminal positioning portion of the cartridge 4 in an insertion process of the cartridge 4 into the accommodation space 61, so that movement in the X direction and the Y direction, which are directions intersecting the insertion direction, is restricted. As a result, positioning of the apparatus-side terminals 721 and the cartridge-side terminals 521 in the directions intersecting the insertion direction is performed.

Two apparatus-side terminal positioning portions 756 are provided for each of the slots 61C to 61K. One of the two apparatus-side terminal positioning portions 756 is also referred to as a first apparatus-side terminal positioning portion 756*t*, and the other of the two apparatus-side terminal positioning portions 756 is also referred to as a second apparatus-side terminal positioning portion 756*w*. The first apparatus-side terminal positioning portion 756*t* and the second apparatus-side terminal positioning portion 756*w* are columnar members extending in the Y direction, respectively. The first apparatus-side terminal positioning portion 756*t* is provided on the first holding portion sidewall 750*ft*. The second apparatus-side terminal positioning portion 756*w* is provided on the second holding portion sidewall 750*fw*.

As illustrated in FIG. 10, the holding portion surface 750*fa* of the terminal holding portion 750 is inclined with respect to the Y direction and the Z direction toward a direction including a +Y direction component and a +Z direction component. A terminal contact 722 of the apparatus-side terminal 721 configured to be in contact with the circuit board 50 protrudes from the holding portion surface 750*fa*. The terminal contact 722 is in a state of being elastically deformable in a direction of an arrow YR1. A +Y-direction-side end portion of the apparatus-side terminal positioning portion 756 is located on the +Y direction side with respect to the terminal contact 722.

As illustrated in FIG. 9, the apparatus-side terminal portion 70 and the apparatus-side identification member 630 are provided on the support member 610, respectively. With regard to the Y direction, which is the direction in which the support member 610 extends, the apparatus-side terminal portion 70 and the apparatus-side identification member 630 are located on an opposite side away from the first apparatus wall 67, with the liquid inlet portion 642 and the opening 614 interposed therebetween. Specifically, the apparatus-side terminal portion 70 and the apparatus-side identification member 630 are provided in the vicinity of the second apparatus wall 62. In addition, the apparatus-side terminal portion 70 is located closer to the second apparatus wall 62, which is on the −Y direction side, than the apparatus-side identification member 630 is. Because of this configuration, in the insertion process of the cartridge 4, after the fitting between the cartridge-side identification member and the apparatus-side identification member 630 is started, contact between the apparatus-side terminals 721 and the cartridge-side terminals 521 is started. Therefore, it is possible to prevent a storage device of the circuit board 50 and the control unit 31 from being electrically connected to each other in a state in which a wrong type of cartridge 4 is mounted, with the cartridge-side terminals 521 of the wrong type of cartridge 4 and the apparatus-side terminals 721 being in contact with each other.

As illustrated in FIG. 7, the engagement forming body 677 is formed on the +Y direction side with respect to the support member 610. In addition, the engagement forming body 677 is located on the −Z direction side with respect to the insertion/removal opening 674. Four mounting engaging portions 697 illustrated in FIG. 3 are arranged in the engagement forming body 677 so as to corresponding to the respective slots 61C to 61K.

A-4. Detailed Configuration of Cartridge 4

Figure 11:
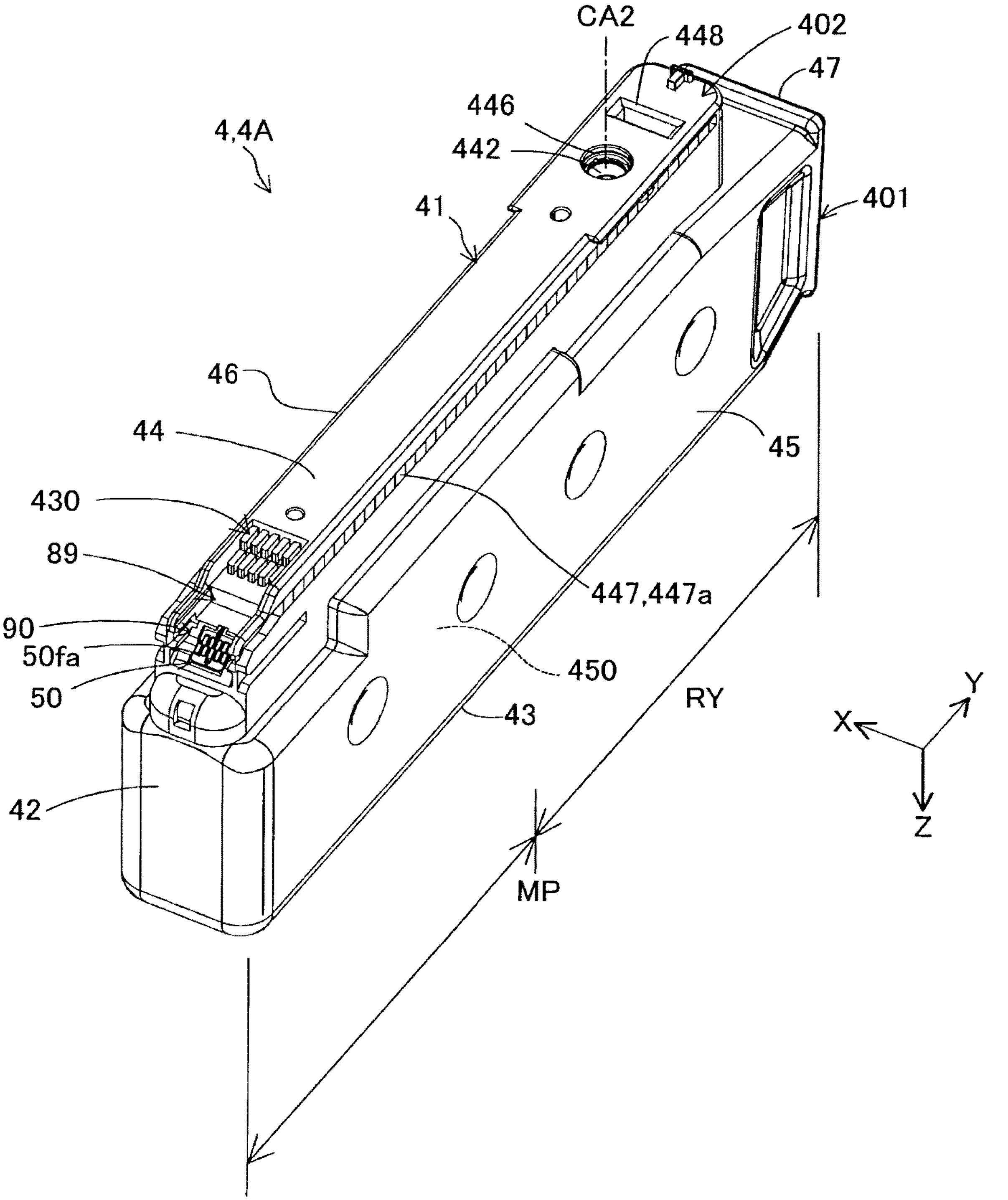
FIG. 11 is a perspective view of a first type of cartridge.
Figure 12:
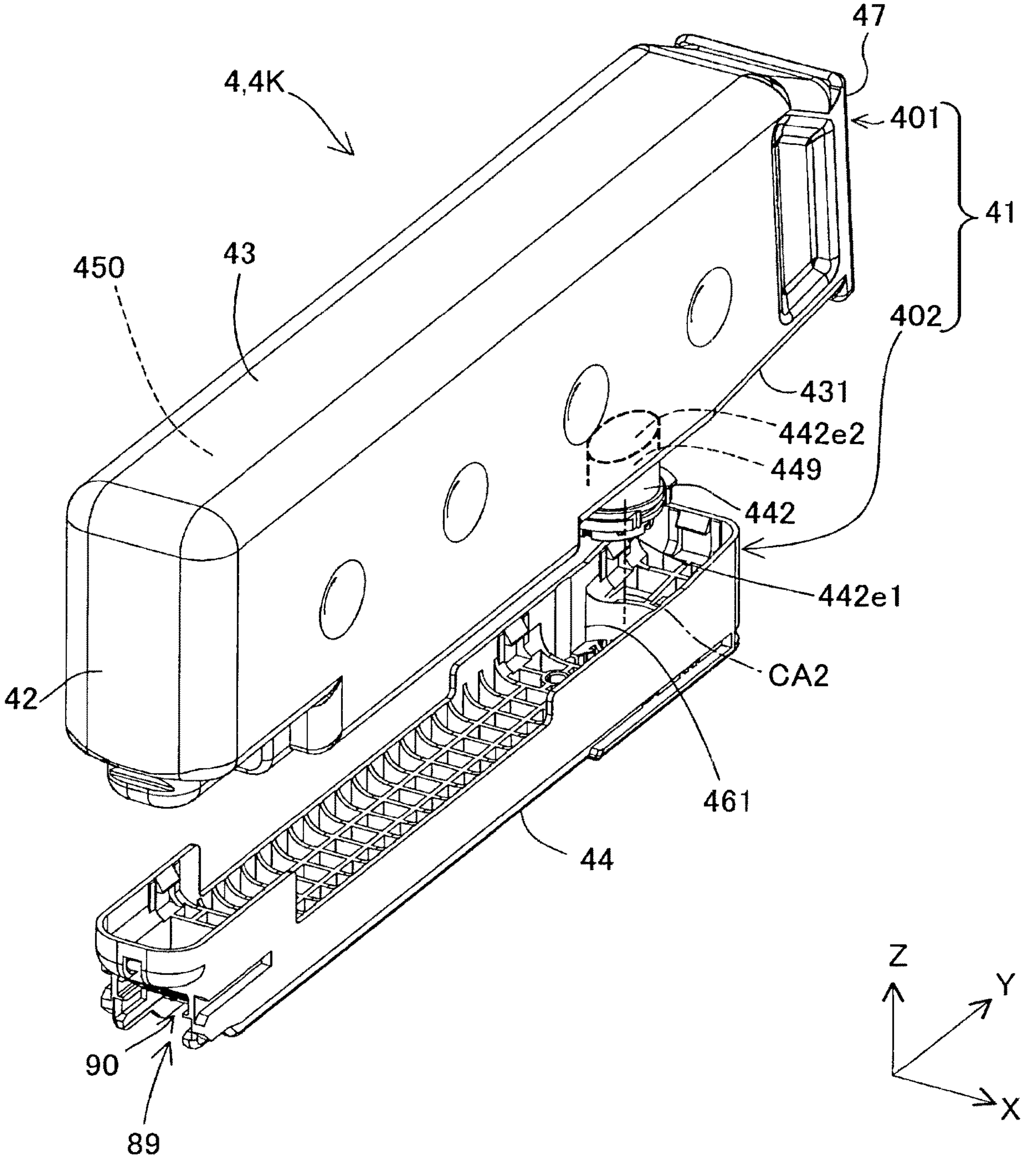
FIG. 12 is an exploded perspective view of the first type of cartridge.
Figure 13:
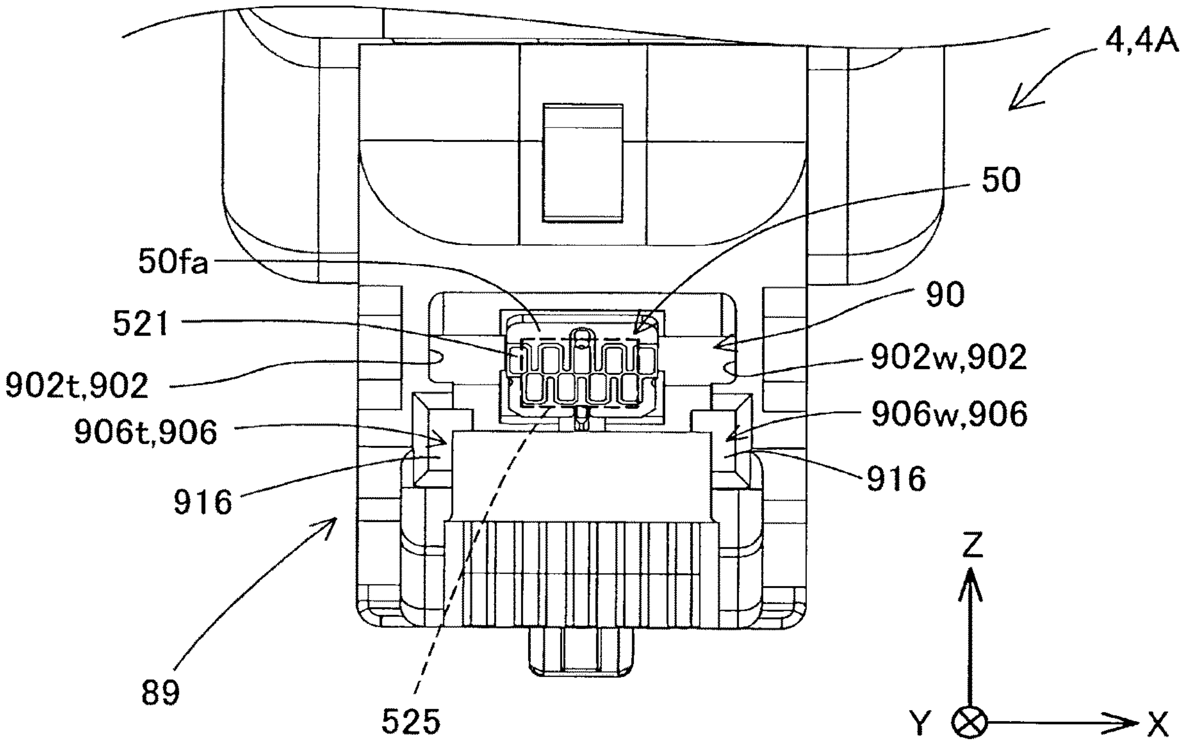
FIG. 13 is a first view illustrating a part of the first type of cartridge.
Figure 14:
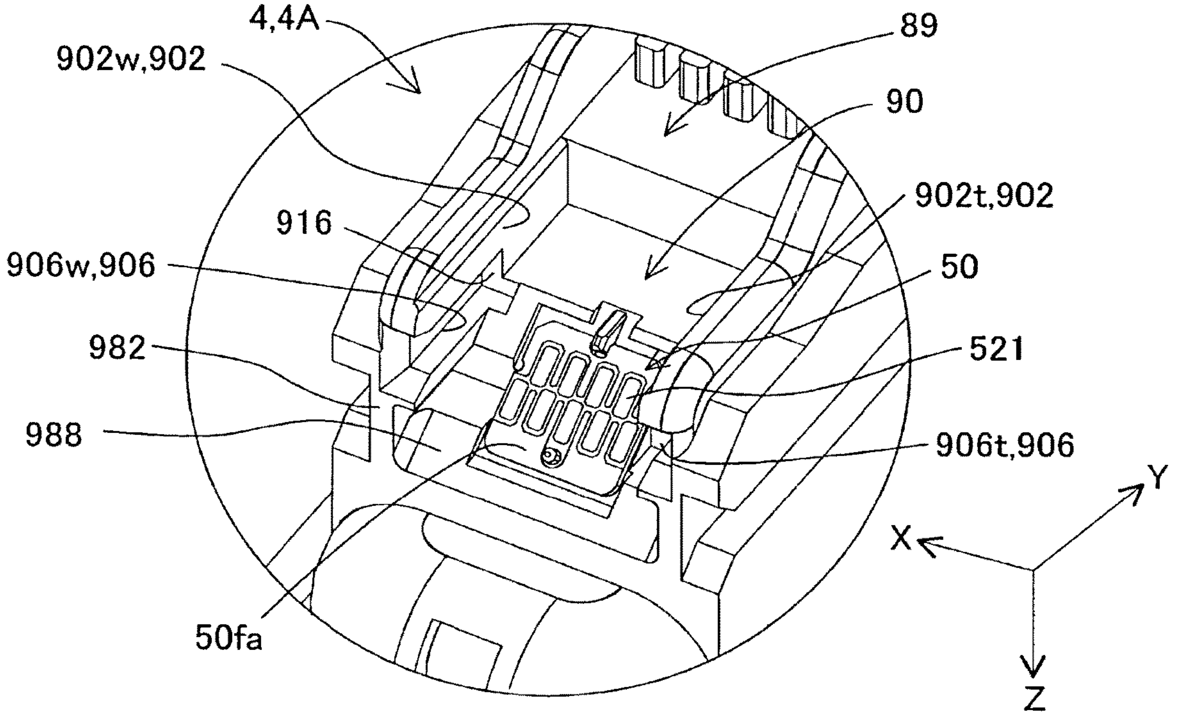
FIG. 14 is a second view illustrating a part of the first type of cartridge.
Figure 15:
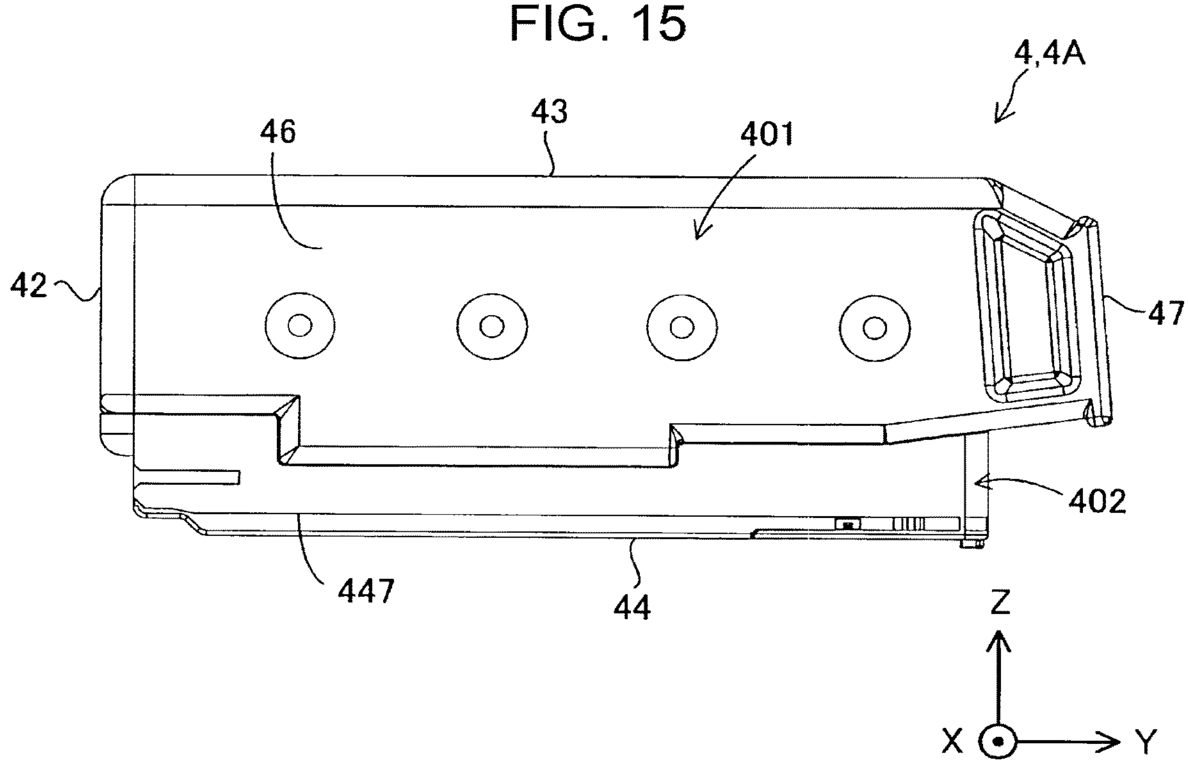
FIG. 15 is a first side view of the first type of cartridge.
Figure 16:
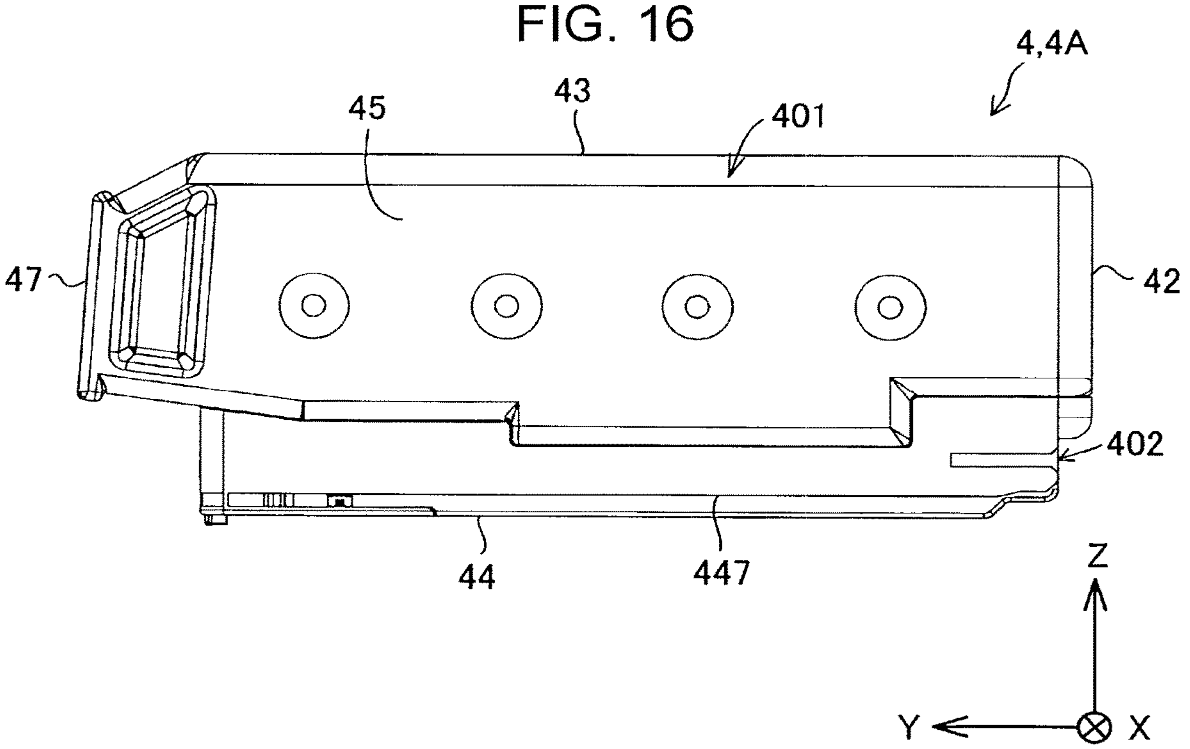
FIG. 16 is a second side view of the first type of cartridge 4A.
Figure 17:
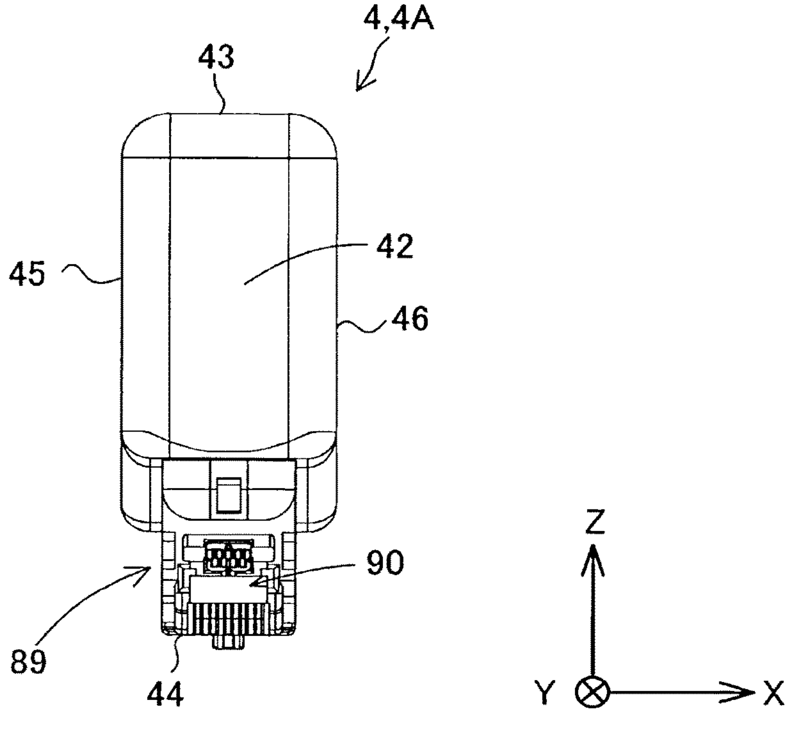
FIG. 17 is a front view of the first type of cartridge.
Figure 18:
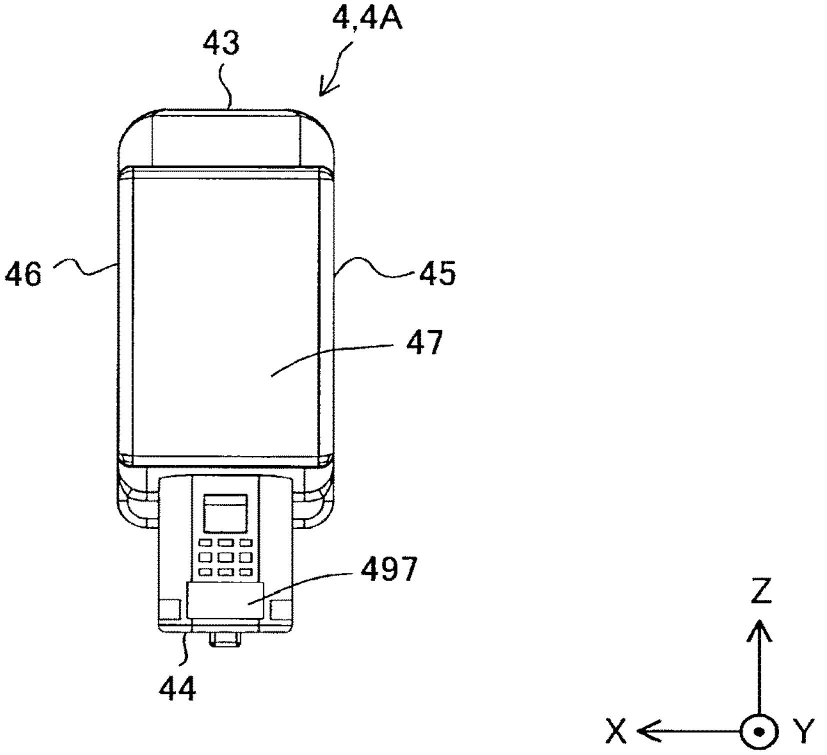
FIG. 18 is a rear view of the first type of cartridge.
Figure 19:
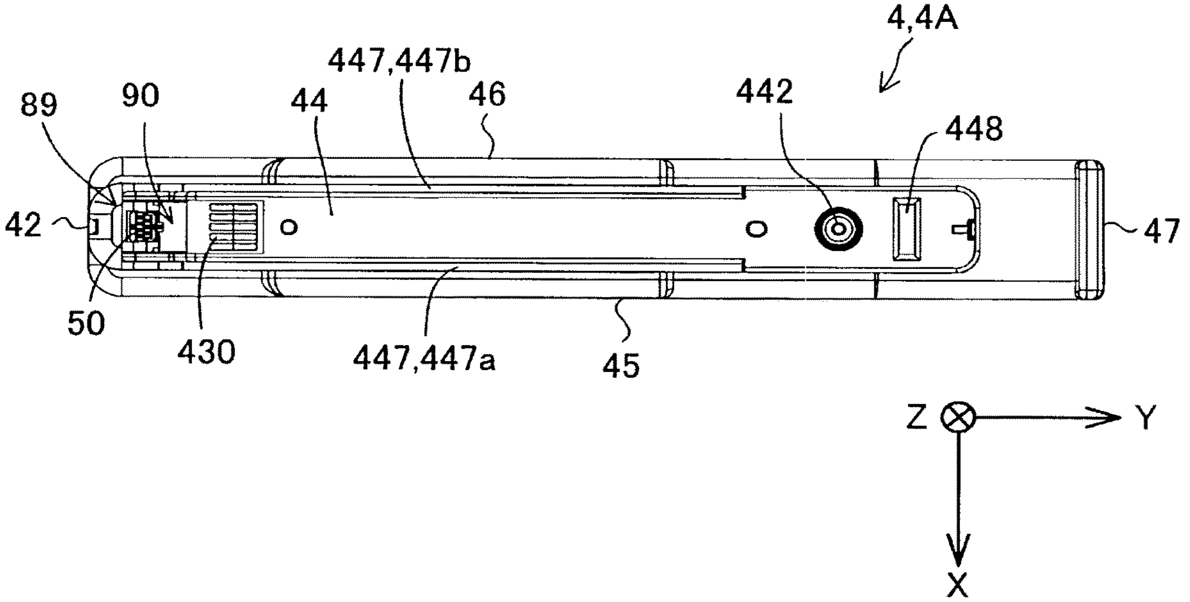
FIG. 19 is a top view of the first type of cartridge.

FIG. 11 is a perspective view of the first type of cartridge 4A. FIG. 12 is an exploded perspective view of the first type of cartridge 4A. FIG. 13 is a first view illustrating a part of the first type of cartridge 4A. FIG. 14 is a second view illustrating a part of the first type of cartridge 4A. FIG. 15 is a first side view of the first type of cartridge 4A. FIG. 16 is a second side view of the first type of cartridge 4A. FIG. 17 is a front view of the first type of cartridge 4A. FIG. 18 is a rear view of the first type of cartridge 4A. FIG. 19 is a top view of the first type of cartridge 4A. Regarding the cartridge 4, the Y direction is a depth direction, the Z direction is a height direction, and the X direction is a width direction. The cartridge 4 is a cartridge that contains a large amount of liquid and has a large outer shape. Regarding the outer shape of the cartridge 4, a dimension in the Y direction is the greatest, and a dimension in the Z direction and a dimension in the X direction are smaller in this order In the drawings illustrating the cartridge 4, the X direction, the Y direction, and the Z direction are based on a state of completion of the terminal connection process, which is a state in which the insertion of the cartridge 4 into the cartridge mounting portion 6 has been completed. That is, in the drawings illustrating the cartridge 4, the X direction, the Y direction, and the Z direction are based on a state before the supply portion coupling process for rotationally moving the support member 610.

As illustrated in FIG. 11, the first type of cartridge 4A includes a liquid container 401 forming a top wall 43 and an adapter 402 forming a bottom wall 44. The adapter 402 is attached to the liquid container 401 by fitting. The liquid container 401 and the adapter 402 are formed of a synthetic resin. The liquid container 401 and the adapter 402 may be formed of the same material or may be formed of different materials. A member forming the liquid container 401 may be lighter than a member forming the adapter 402. This improves operability of the cartridge 4.

An outer shape of the first type of cartridge 4A is a substantially rectangular parallelepiped shape. The first type of cartridge 4A includes a main body 41 forming an outer shell and a circuit board 50 attached to the main body 41. The main body 41 is comprised of the liquid container 401 and the adapter 402 described above. The main body 41 of the first type of cartridge 4A has a front wall 42, a rear wall 47, the top wall 43, the bottom wall 44, a first sidewall 45, a second sidewall 46, and a corner portion 89. Each wall 42, 43, 44, 45, 46, and 47 is also referred to as each surface 42, 43, 44, 45, 46, and 47. The front wall 42 and the rear wall 47 face each other in the Y direction along the insertion direction. The top wall 43 and the bottom wall 44 face each other in the Z direction. The Z direction is parallel to the central axis CA2 along an extending direction of the liquid supply portion 442. The first sidewall 45 and the second sidewall 46 face each other in the X direction. The X direction is a direction orthogonal to the Y direction and the Z direction.

As illustrated in FIG. 15, the front wall 42 is located on the insertion-direction side; the insertion direction is a direction in which the cartridge 4 is inserted into the cartridge mounting portion 6. That is, the front wall 42 forms an insertion leading-end surface on the −Y direction side, which is the insertion-direction side. The rear wall 47 forms a surface on the +Y direction side, toward which removal is performed. The top wall 43 is located on the +Z direction side and intersects the front wall 42 and the rear wall 47. As illustrated in FIG. 11, the bottom wall 44 is located on the −Z direction side, which is the gravity-direction side in the mounted state, and forms a coupling leading-end surface in the coupling direction D2 illustrated in FIG. 3. That is, the bottom wall 44 is located on the coupling-direction D2 side. The bottom wall 44 intersects the front wall 42 and the rear wall 47. An insertion opening 446 is formed in the bottom wall 44. The liquid supply portion 442 is disposed in the insertion opening 446. The liquid supply portion 442 is disposed such that the central axis CA2 of the liquid supply portion 442 passes through the insertion opening 446. In a mounting process of the cartridge 4, the liquid inlet portion 642 of the cartridge mounting portion 6 is inserted through the insertion opening 446. The insertion opening 446 and the liquid supply portion 442 are located in a region RY between a middle portion MP of the cartridge 4 and an end portion on the rear-wall 47 side in the insertion direction.

As illustrated in FIG. 17, the first sidewall 45 is located on the −X direction side, and the second sidewall 46 is located on the +X direction side. Each of the first sidewall 45 and the second sidewall 46 intersects the front wall 42, the rear wall 47, the top wall 43, and the bottom wall 44. The corner portion 89 is provided at a corner where the front wall 42 and the bottom wall 44 intersect each other. The corner portion 89 has a recess portion 90 recessed inward.

The first type of cartridge 4A further includes, as illustrated in FIG. 11, the liquid containing portion 450 containing a liquid, the liquid supply portion 442, a cartridge-side identification member 430, the supply portion positioning portion 448, the circuit board 50, and cartridge guide portions 447. The first type of cartridge 4A further includes the cartridge engaging portion 497 illustrated in FIG. 18.

The liquid supply portion 442 illustrated in FIG. 12 communicates with the liquid containing portion 450 and has the central axis CA2. The direction along the central axis CA2 is the Z direction. The direction along the central axis CA2, in which the liquid supply portion 442 extends, intersects the −Y direction, which is the insertion direction. That is, the liquid supply portion 442 extends in the direction intersecting the insertion direction, namely, extends in the Z direction in the present embodiment. The liquid supply portion 442 is a cylindrical member that protrudes from a container bottom wall 431, which is a bottom wall of the liquid container 401, toward the adapter 402. The liquid supply portion 442 is disposed in a recess-shaped supply portion disposing chamber 461 of the adapter 402. The insertion opening 446 illustrated in FIG. 11 is formed at a recessed-shaped bottom portion of the supply portion disposing chamber 461.

The liquid supply portion 442 has an internal flow passage 449, and the liquid of the liquid containing portion 450 flows therethrough out to the liquid inlet portion 642. A supply base end portion 442*e*2, which is a base end portion of the liquid supply portion 442, is connected to the container bottom wall 431, which is the bottom wall of the liquid container 401. A supply tip portion 442*e*1, which is a tip portion of the liquid supply portion 442, opens toward the outside. A non-illustrated valve mechanism that opens/closes the internal flow passage 449 is disposed in the internal flow passage 449 of the liquid supply portion 442. The valve mechanism has a valve seat, a valve body, and an urging member in this order from the supply tip portion 442*e*1. The valve seat is an annular member formed of rubber or elastomer. The valve body is a columnar member and closes a valve hole formed in the valve seat. The urging member is a coil spring that urges the valve body toward the valve seat. In the mounted state of the cartridge 4, the liquid inlet portion 642 pushes the valve body in a direction away from the valve seat, thereby opening the valve mechanism.

The cartridge-side identification member 430 illustrated in FIG. 11 is used for identifying whether or not the cartridge 4 has been inserted into the correct slot 61C, 61M, 61Y, or 61K of the cartridge mounting portion 6. The cartridge-side identification member 430 is comprised of ribs arranged, on the bottom wall 44, at the side close to the front wall 42, that is, at a location adjacent to the corner portion 89 in the present embodiment. The cartridge-side identification members 430 form different pattern shapes corresponding to the colors of the liquids contained in the cartridges 4C, 4M, 4Y, and 4K. The pattern shape is determined by the number and locations of ribs.

The supply portion positioning portion 448 receives the apparatus-side supply portion positioning portion 644 to perform positioning of the liquid supply portion 442 with respect to the liquid inlet portion 642. Specifically, in the supply portion coupling process, the supply portion positioning portion 448 performs positioning of the liquid supply portion 442 with respect to the liquid inlet portion 642 by receiving the apparatus-side supply portion positioning portion 644 to restrict the movement of the supply portion positioning portion 448 in a direction intersecting the coupling direction D2. The supply portion positioning portion 448 is a recess portion formed in the bottom wall 44 and recessed from an outer surface of the bottom wall 44. In another embodiment, the supply portion positioning portion 448 may be a hole penetrating through the bottom wall 44. The supply portion positioning portion 448 is a recess portion having a substantially rectangular parallelepiped shape, and an opening area of an entrance portion formed on an outer surface side of the bottom wall 44 is greater than an opening area on a bottom side of the recess portion, which is a side deeper than the entrance portion. This configuration enables the supply portion positioning portion 448 to easily receive the apparatus-side supply portion positioning portion 644 in the supply portion coupling process. With regard to the insertion direction, the supply portion positioning portion 448 is located on an opposite side away from the cartridge-side terminals 521 of the circuit board 50, with the liquid supply portion 442 and the insertion opening 446 interposed therebetween. In the present embodiment, the supply portion positioning portion 448 is formed in the vicinity of the rear wall 47 in the bottom wall 44.

As illustrated in FIG. 18, the cartridge engaging portion 497 is provided in the rear wall 47. The cartridge engaging portion 497 is a recess portion recessed from an outer surface of the rear wall 47.

As illustrated in FIG. 13, the circuit board 50 is disposed at the corner portion 89. The circuit board 50 has a plurality of cartridge-side terminals 521 disposed on its front surface 50*fa* and a storage device 525 disposed on its rear surface. The plurality of cartridge-side terminals 521, which can be electrically connected to the apparatus-side terminals by contact therewith, are electrically connected to the storage device 525 via wiring. In the present embodiment, the number of the plurality of cartridge-side terminals 521 provided is nine. The front surface 50*fa*, on which the plurality of cartridge-side terminals 521 are disposed, is inclined with respect to the insertion direction. Specifically, the front surface 50*fa* is inclined with respect to the insertion direction toward a direction including a −Z direction component and a −Y direction component. The storage device 525 stores information regarding the cartridge 4, for example, the date of manufacture or the remaining amount of liquid. In the mounted state, the plurality of cartridge-side terminals 521 are electrically connected to the corresponding apparatus-side terminals 721 by being in contact with the corresponding apparatus-side terminals 721. Therefore, the control unit 31 of the printing apparatus 10 and the storage device 525 are electrically connected to each other, and data communication can be performed therebetween.

As illustrated in FIG. 14, the circuit board 50 is disposed in the recess portion 90 of the corner portion 89. As illustrated in FIG. 11, the recess portion 90 is provided over the front wall 42 and the bottom wall 44. As illustrated in FIG. 14, the recess portion 90 has a recess portion front wall 982 forming an entrance opening located on the front-wall 42 side, a recess portion bottom wall 988 forming a bottom portion of the recess portion 90, and a pair of recess portion sidewalls 902*t* and 902*w*.

The recess portion bottom wall 988 has a portion inclined with respect to the Y direction. In the present embodiment, the inclined portion is sloped in such a way as to be located more on the +Z direction side as it goes toward the recess portion front wall 982 with respect to the Y direction. The circuit board 50 is disposed on this inclined portion.

The pair of recess portion sidewalls 902*t* and 902*w* are walls to which the recess portion bottom wall 988 is connected. The pair of recess portion sidewalls 902*t* and 902*w* face each other in the X direction. The first recess portion sidewall 902*t* is connected to a −X-direction-side end portion of the recess portion bottom wall 988. The second recess portion sidewall 902*w* is connected to a +X-direction-side end portion of the recess portion bottom wall 988. The first recess portion sidewall 902*t* and the second recess portion sidewall 902*w* are referred to as a recess portion sidewall 902 when no distinction is made therebetween. An entrance opening formed as an opening in the recess portion front wall 982 serves as an entrance when the apparatus-side terminal portion 70 is inserted into the recess portion 90.

The pair of recess portion sidewalls 902*t* and 902*w* are provided with a pair of terminal positioning portions 906*t* and 906*w*, respectively. The pair of terminal positioning portions 906*t* and 906*w* are provided so as to face each other in the X-axis direction. The pair of terminal positioning portions 906*t* and 906*w* are also referred to as a first terminal positioning portion 906*t* and a second terminal positioning portion 906*w* when a distinction is made therebetween. The pair of terminal positioning portions 906*t* and 906*w* are also referred to as a terminal positioning portion 906 when no distinction is made therebetween. The terminal positioning portion 906 is a groove formed in the recess portion sidewall 902. The first terminal positioning portion 906*t* is a groove having a shape recessed from a surface of the first recess portion sidewall 902*t*. The second terminal positioning portion 906*w* is a groove having a shape recessed from a surface of the second recess portion sidewall 902*w*.

The first terminal positioning portion 906*t* receives the first apparatus-side terminal positioning portion 756*t* illustrated in FIG. 9 in the terminal connection process. That is, the first apparatus-side terminal positioning portion 756*t* is inserted into the first terminal positioning portion 906*t*. The second terminal positioning portion 906*w* receives the second apparatus-side terminal positioning portion 756*w* illustrated in FIG. 9 in the terminal connection process. That is, the second apparatus-side terminal positioning portion 756*w* is inserted into the second terminal positioning portion 906*t*. The insertion of the apparatus-side terminal positioning portion 756 into the terminal positioning portion 906 is performed after the fitting between the cartridge-side identification member 430 and the apparatus-side identification member 630 has been started. The insertion of the apparatus-side terminal positioning portion 756 into the terminal positioning portion 906 is started before the contact between the apparatus-side terminals 721 and the cartridge-side terminals 521 is started.

Due to receiving the apparatus-side terminal positioning portion 756 by the terminal positioning portion 906, the apparatus-side terminal positioning portion 756 and the terminal positioning portion 906 come into contact with each other. As a result, the movement of the cartridge-side terminals 521 with respect to the apparatus-side terminals 721 in the Z direction and the X direction, which are the directions intersecting the insertion direction, is restricted. Because of the restriction of the movement, positioning of the cartridge-side terminals 521 with respect to the apparatus-side terminals 721 in the Z direction and the X direction, which are the directions intersecting the insertion direction, is performed. The terminal positioning portion 906 has an end wall 916 on the +Y direction side. The cartridge 4 is further pushed in the insertion direction from an abutting position where a tip portion of the apparatus-side terminal positioning portion 756 abuts on the end wall 916, and, as a result, the terminal connection process is completed. Since the cartridge 4 is further pushed in the insertion direction from the abutting position, the holding mechanism 73 is pushed in the insertion direction. Therefore, the apparatus-side terminal portion 70 moves in the insertion direction in accordance with the movement of the cartridge 4. In a state in which the terminal connection process is completed, the urging member 780 illustrated in FIG. 4 is in a compressed state. In addition, in the state in which the terminal connection process is completed, the apparatus-side terminals 721 and the cartridge-side terminals 521 are in contact with each other.

As illustrated in FIGS. 11 and 19, the cartridge guide portions 447 extend along the −Y direction, which is the insertion direction. The cartridge guide portions 447 are guided in the insertion direction by the apparatus guide portions 602 of the cartridge mounting portion 6. The cartridge guide portions 447 are formed on the first sidewall 45 and the second sidewall 46, respectively. In FIG. 11, the cartridge guide portion 447 formed on the first sidewall 45 is illustrated with single hatching. The cartridge guide portions 447 are formed on the first sidewall 45 and the second sidewall 46, respectively, by steps. That is, with regard to a width of the cartridge 4, a part including the bottom wall 44 is narrower than the other part that is more distant from the bottom wall 44 than the part including the bottom wall is. Therefore, the step forming the cartridge guide portion 447 is formed. The cartridge guide portion 447 is a surface facing the −Z direction. The cartridge guide portion 447 formed on the first sidewall 45 is also referred to as a first cartridge guide portion 447*a*, and the cartridge guide portion 447 formed on the second sidewall 46 is also referred to as a second cartridge guide portion 447*b*.

When the cartridge 4 is inserted into the cartridge mounting portion 6, the cartridge guide portion 447 comes into contact with a surface of the apparatus guide portion 602 on the +Z direction side, thereby guiding the movement of the cartridge 4 in the insertion direction in a state in which a posture of the cartridge 4 is maintained. The first cartridge guide portion 447*a* comes into contact with a surface of the first apparatus guide portion 602*a* on the +Z direction side, and the second cartridge guide portion 447*b* comes into contact with a surface of the second apparatus guide portion 602*b* on the +Z direction side.

As illustrated in FIGS. 11 and 12, the adapter 402 includes the corner portion 89 having the terminal positioning portion 906 and the cartridge-side terminals 521, the cartridge-side identification member 430, the insertion opening 446, the supply portion positioning portion 448, the cartridge guide portions 447, and the supply portion disposing chamber 461.

Figure 20:
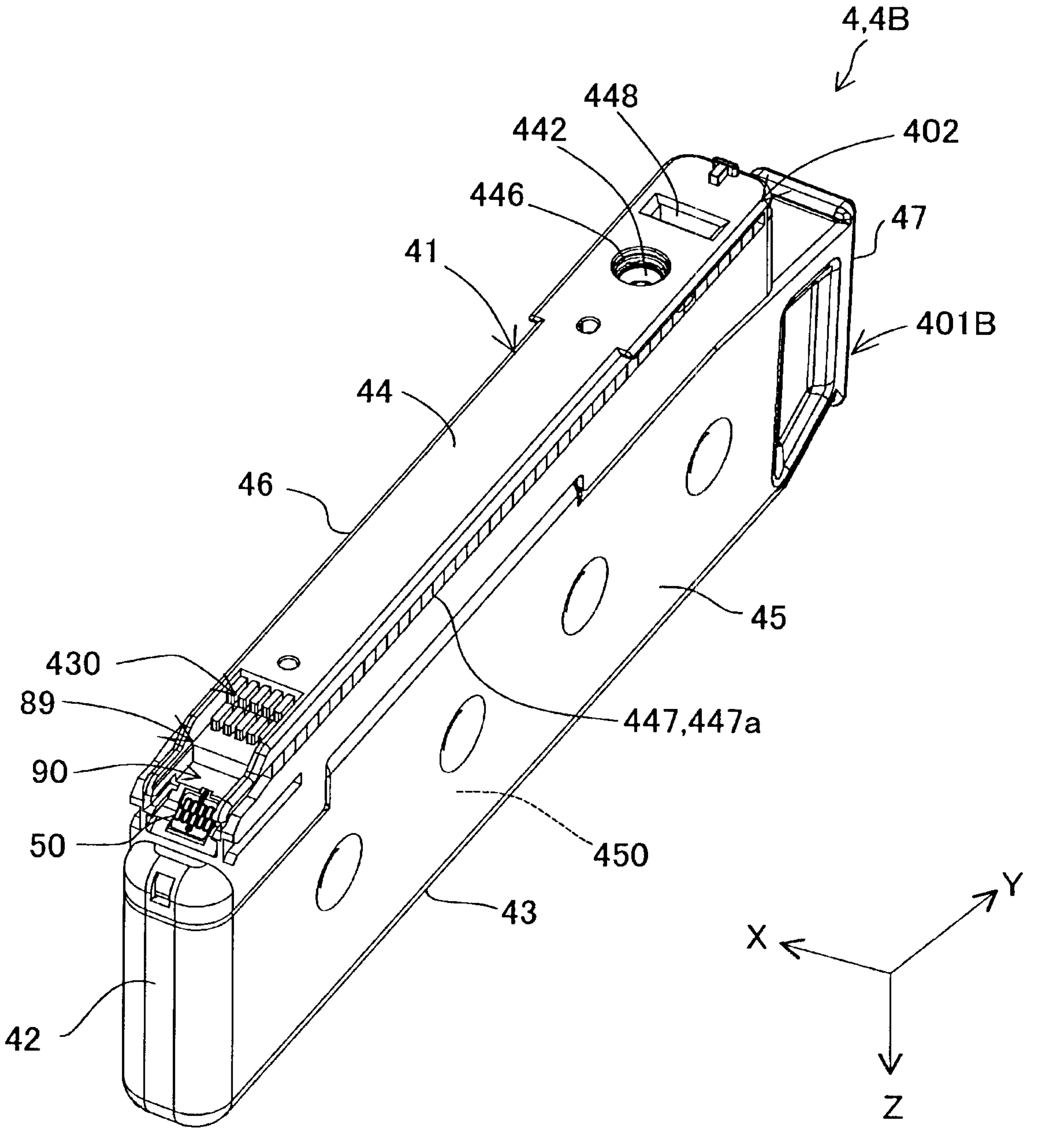
FIG. 20 is a perspective view of a second type of cartridge.
Figure 21:
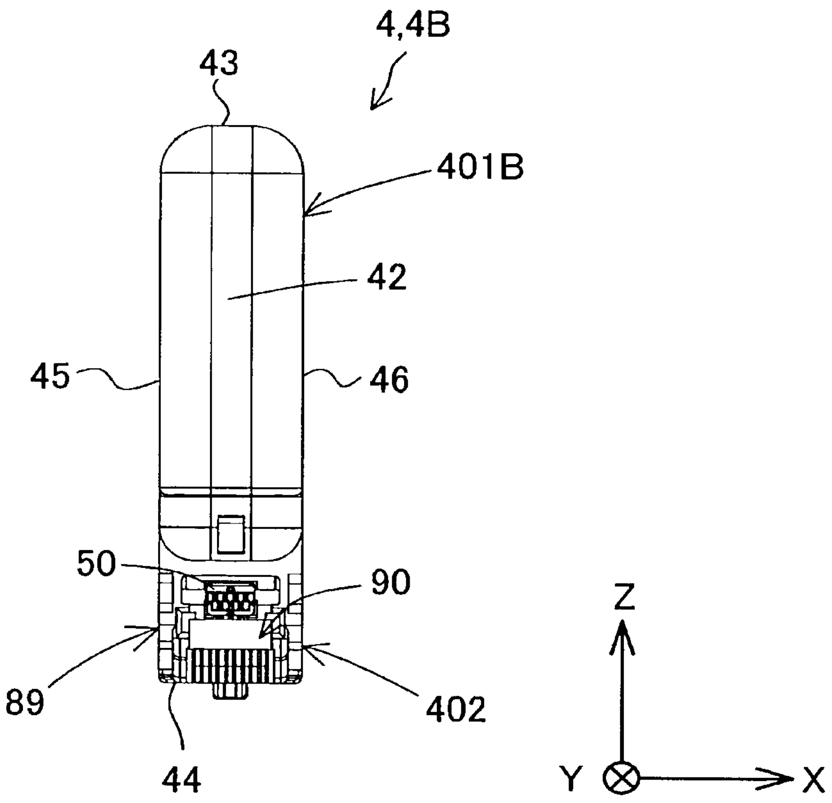
FIG. 21 is a front view of the second type of cartridge.
Figure 22:
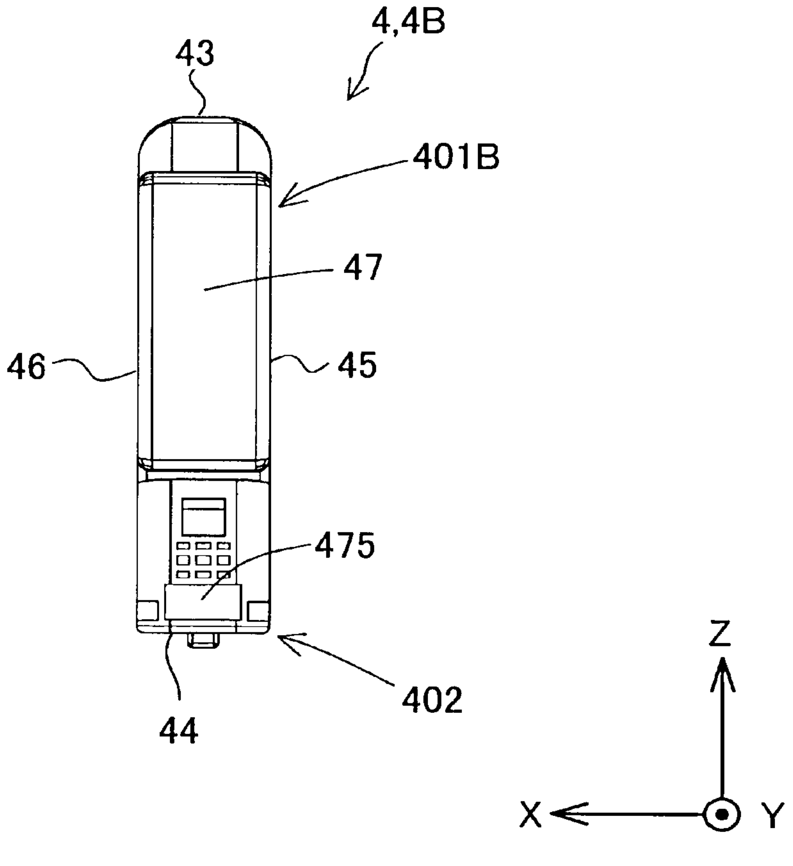
FIG. 22 is a rear view of the second type of cartridge.

FIG. 20 is a perspective view of the second type of cartridge 4B. FIG. 21 is a front view of the second type of cartridge 4B. FIG. 22 is a rear view of the second type of cartridge 4B. The difference between the second type of cartridge 4B and the first type of cartridge 4A lies in that a width of a liquid container 401B is smaller than that of the liquid container 401 illustrated in FIG. 11. Because of this difference, an amount of liquid that can be contained in a liquid containing portion 450 formed in the liquid container 401B is smaller than an amount of liquid that can be contained in the liquid containing portion 450 formed in the liquid container 401. Since the other components of the second type of cartridge 4B are the same as those of the first type of cartridge 4A, the same components will be denoted by the same reference numerals, and a description thereof will be omitted.

An adapter 402 of the second type of cartridge 4B has the same configuration as the adapter 402 of the first type of cartridge 4A except for a pattern shape formed by a cartridge-side identification member 430. Therefore, the adapter 402 can be used in common for the cartridges 4A and 4B having different capacities.

A-5. Mounting Process of Cartridge into Cartridge Mounting Portion

Figure 23:
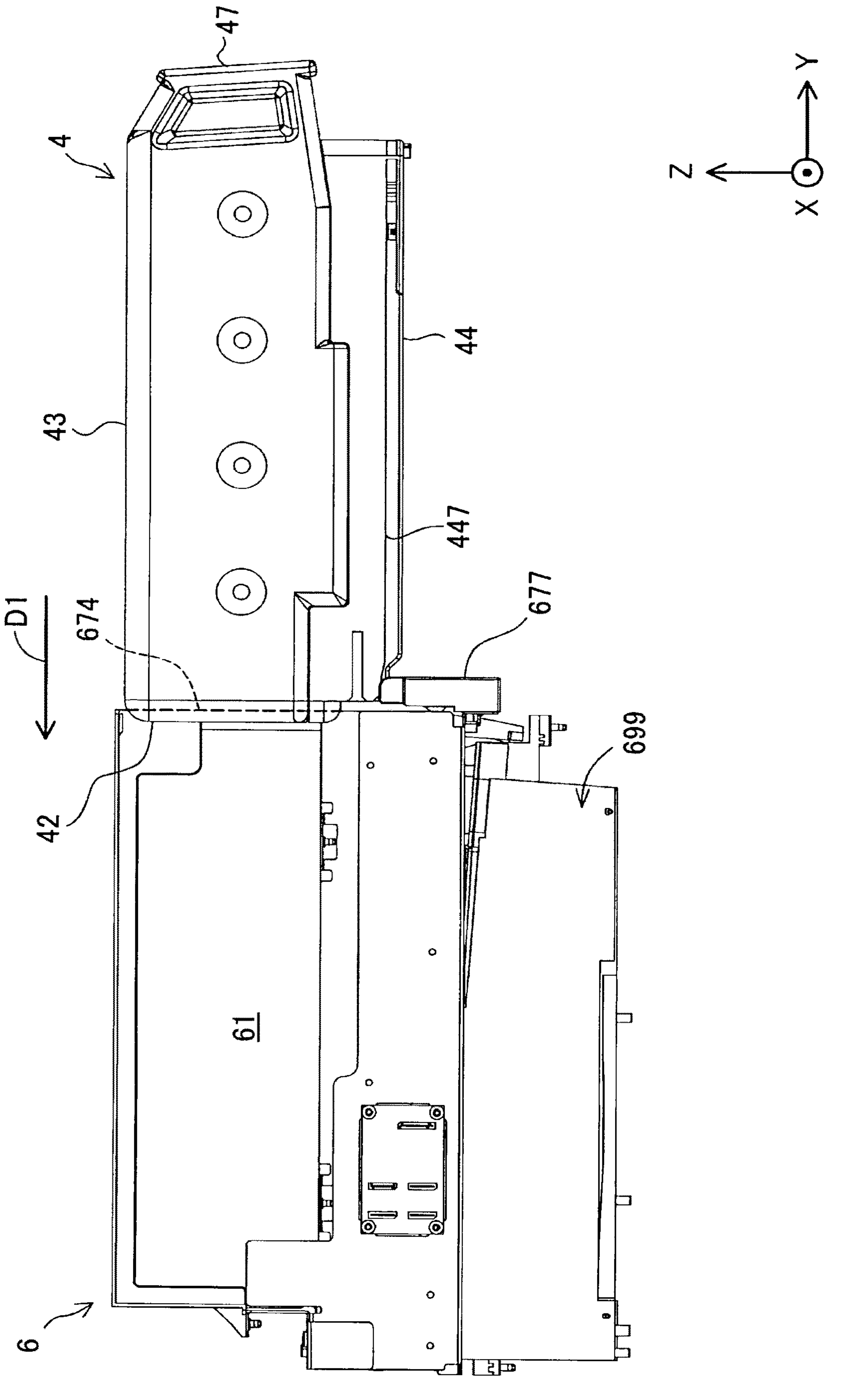
FIG. 23 is a first view for explaining a mounting process.
Figure 24:
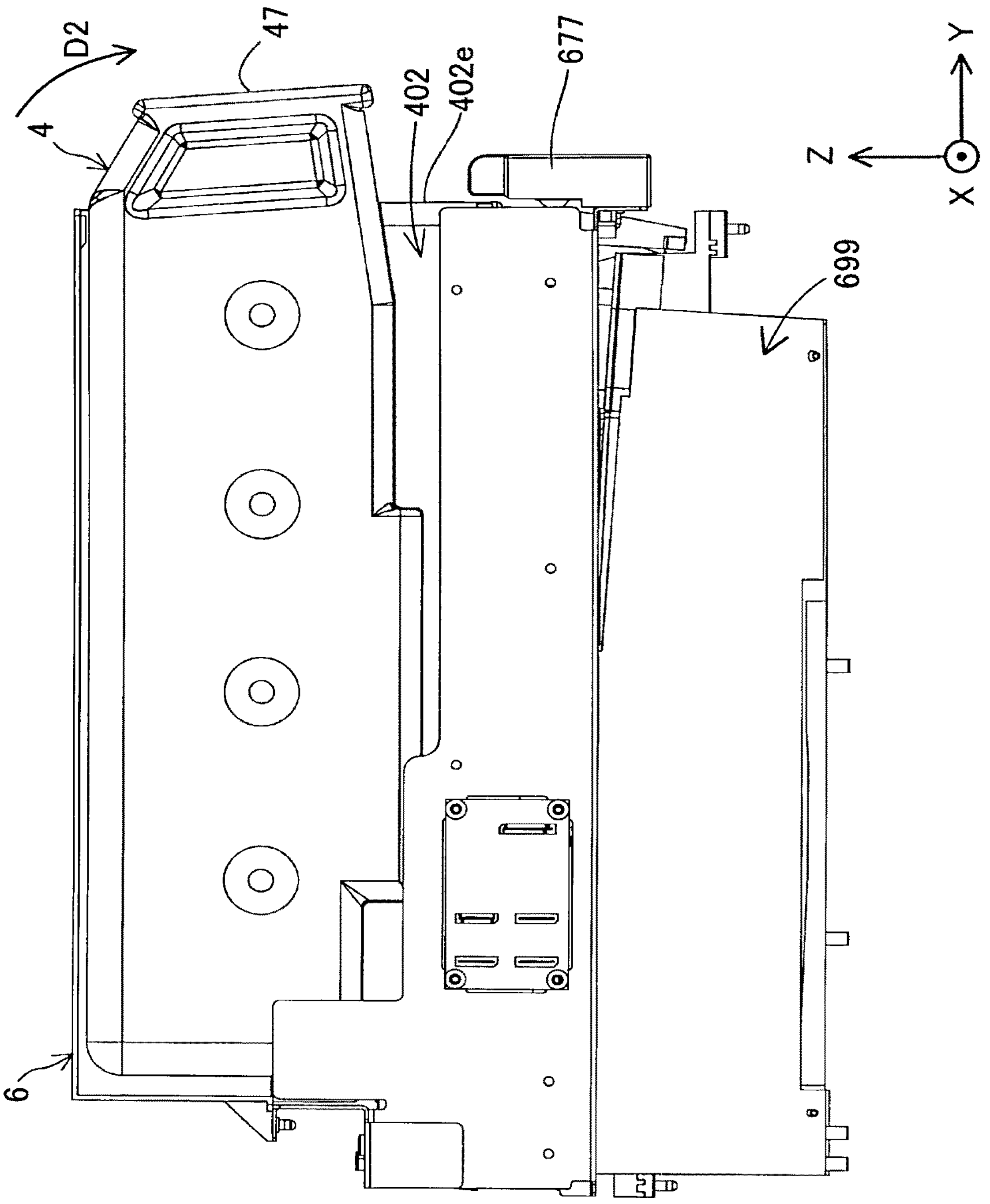
FIG. 24 is a second view for explaining the mounting process.
Figure 25:
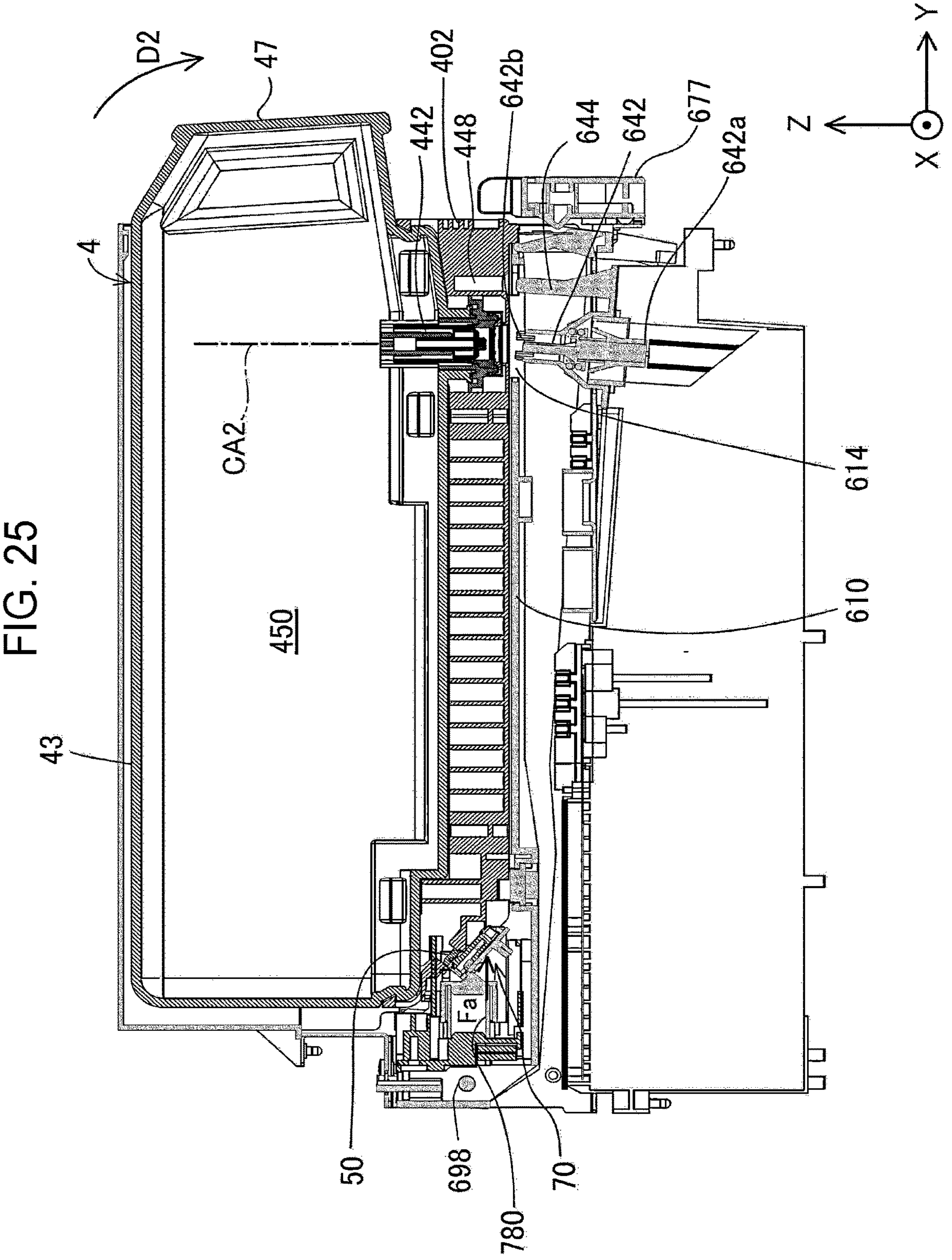
FIG. 25 is a sectional view of FIG. 24.
Figure 26:
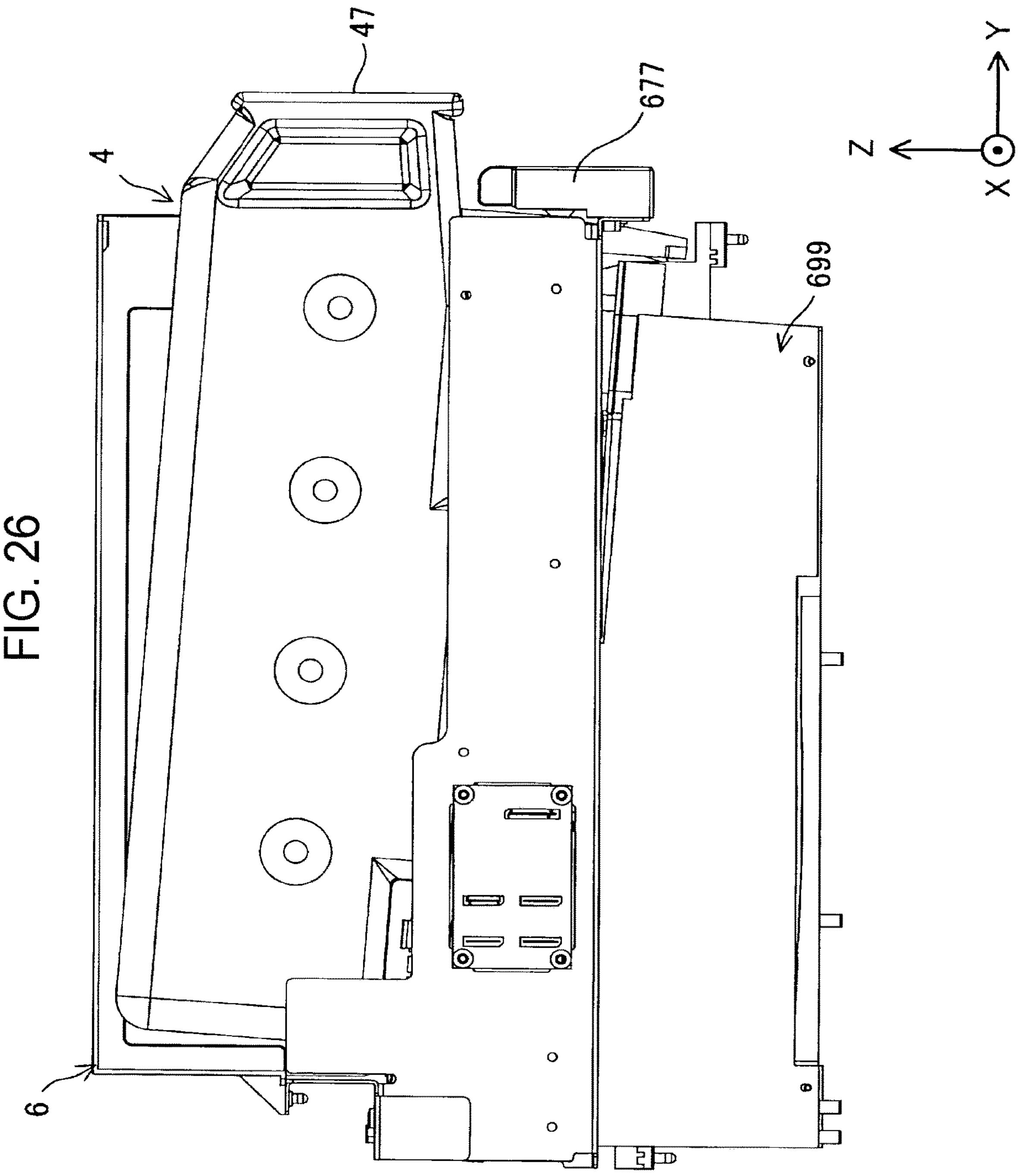
FIG. 26 is a third view for explaining the mounting process.
Figure 27:
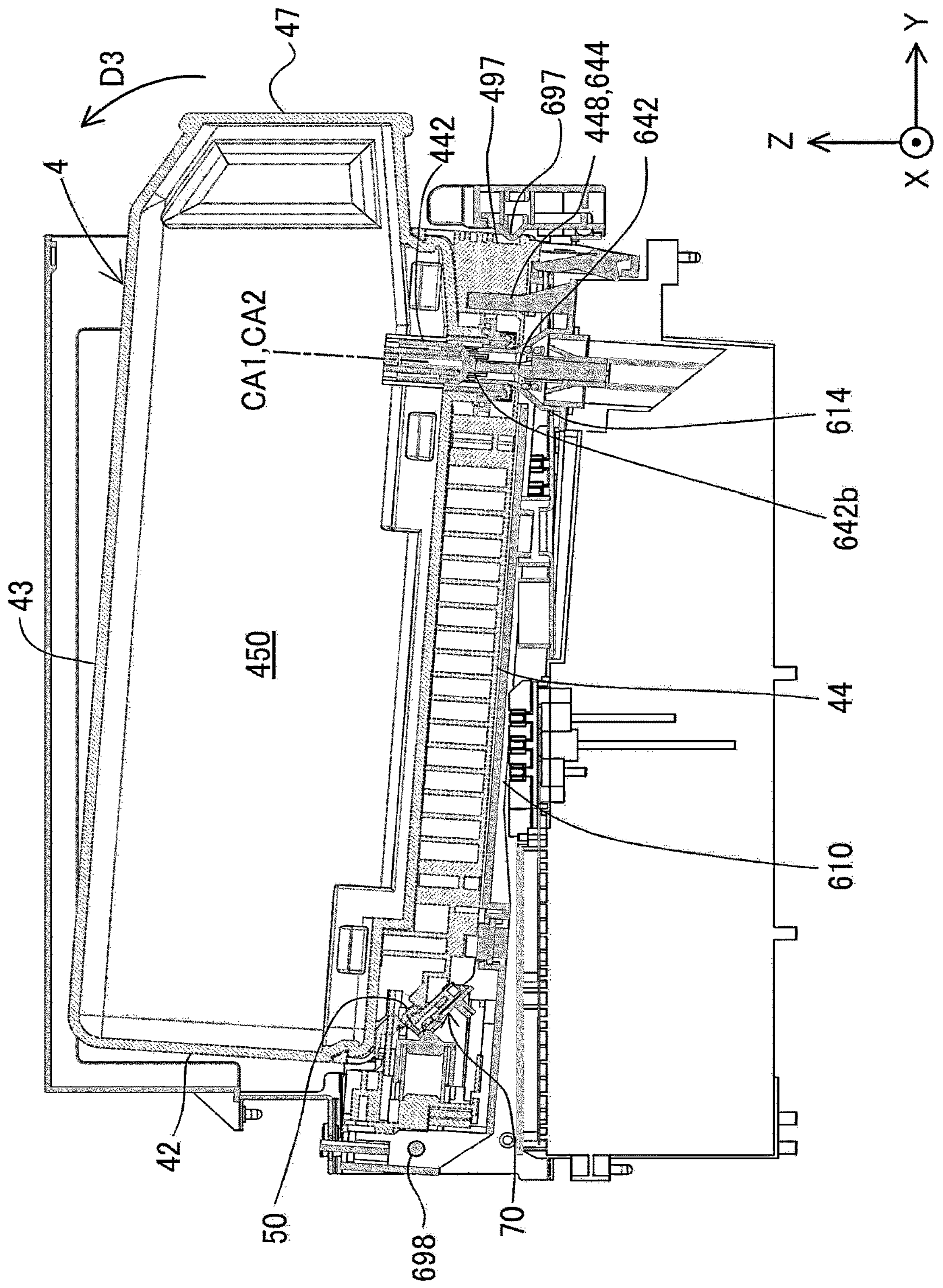
FIG. 27 is a sectional view of FIG. 26.

FIG. 23 is a first view for explaining a mounting process. FIG. 24 is a second view for explaining the mounting process. FIG. 25 is a sectional view of FIG. 24, and corresponds to a section taken along the line 3-3 of FIG. 2. FIG. 26 is a third view for explaining the mounting process. FIG. 27 is a sectional view of FIG. 26, and corresponds to a section taken along the line 3-3 of FIG. 2. FIGS. 23 to 25 illustrate the terminal connection process, and FIGS. 26 and 27 illustrate the supply portion coupling process.

As illustrated in FIG. 23, when the cartridge 4 is mounted into the cartridge mounting portion 6, the cartridge 4 is first inserted from the insertion/removal opening 674 of the cartridge mounting portion 6 into the accommodation space 61. The insertion direction D1 of the cartridge 4 into the cartridge mounting portion 6 is the −Y direction, and is parallel to a direction in which the cartridge guide portions 447 extend.

When the cartridge 4 is further pushed in the insertion direction D1 from a state illustrated in FIG. 23, the terminal connection process is completed as illustrated in FIG. 24. In the completed state of the terminal connection process illustrated in FIG. 24, an end portion 402*e* of the adapter 402 on the +Y direction side is located on the insertion-direction side with respect to the engagement forming body 677. In addition, as illustrated in FIG. 25, in the completed state of the terminal connection process, the cartridge-side terminals 521 and the apparatus-side terminals 721 are in contact with each other. Moreover, in the completed state of the terminal connection process, the urging member 780 is compressed, and the apparatus-side terminal portion 70 receives an external force Fa from the urging member 780. The user executes the supply portion coupling process by rotationally moving the cartridge 4 in the coupling direction D2, with the rotation fulcrum 698 as the fulcrum, while pushing the cartridge 4 toward the insertion-direction side.

When the cartridge 4 rotationally moves in the coupling direction D2, the reception of the apparatus-side supply portion positioning portion 644 by the supply portion positioning portion 448 is started before the coupling between the liquid inlet portion 642 and the liquid supply portion 442 is started. Thereafter, the positioning of the liquid supply portion 442 with respect to the liquid inlet portion 642 is started. That is, the movement of the liquid supply portion 442 in a direction intersecting the central axis CA2 of the liquid supply portion 442 is restricted. In the supply portion coupling process, when the apparatus-side supply portion positioning portion 644 is inserted into the liquid inlet portion 642, it could happen that the cartridge 4 moves minutely in the Y direction. In this case, due to expansion/contraction of the urging member 780, the apparatus-side terminal portion 70 moves in accordance with the movement of the cartridge-side terminals 521. This makes it possible to keep good contact between the cartridge-side terminals 521 and the apparatus-side terminals 721.

As illustrated in FIG. 27, in the mounted state of the cartridge 4 after the completion of the supply portion coupling process, the cartridge-side terminals 521 of the circuit board 50 and the apparatus-side terminals 721 of the apparatus-side terminal portion 70 are in contact with each other, and the liquid supply portion 442 and the liquid inlet portion 642 are coupled to each other. In the mounted state, the insertion direction D1 of the cartridge 4 intersects the direction in which the liquid supply portion 442 extends. In addition, in the mounted state, the cartridge 4 is mounted in the cartridge mounting portion 6 such that the direction in which the liquid supply portion 442 extends includes a gravity direction component. This enables the liquid in the liquid supply portion 442 to flow smoothly. Therefore, it is possible to reduce an amount of liquid that will be left in the liquid containing portion 450 without being consumed. In the present embodiment, in the mounted state, the liquid supply portion 442 is inclined with respect to the gravity direction such that the direction in which the liquid supply portion 442 extends and the gravity direction form an angle that is within a range of greater than 0° to not greater than 15°.

In the mounted state, the mounting engaging portion 697 is engaged with the cartridge engaging portion 497 to keep the cartridge 4 mounted. The user raises the rear-wall 47 side of the cartridge 4 to rotate it in an uncoupling direction D3, which is the opposite of the coupling direction D2, with the rotation fulcrum 698 as the fulcrum. Due to this rotation, the mounting engaging portion 697 is displaced by being pushed by the main body of the cartridge 4, and, as a result, the mounting engaging portion 697 becomes disengaged from the cartridge engaging portion 497.

According to the above embodiment, as illustrated in FIG. 27, the cartridge 4 has the liquid supply portion 442 disposed in the bottom wall 44 intersecting the front wall 42 located on the insertion-direction side. Because of this configuration, in the mounted state, the bottom wall 44 is located on the gravity-direction side and, therefore, the liquid in the liquid containing portion 450 is able to flow smoothly to the liquid supply portion 442. Therefore, it is possible to reduce an amount of liquid that will be left in the liquid containing portion 450 without being consumed. As illustrated in FIG. 23, the insertion direction D1 of the cartridge 4 and the removal direction, which is the opposite of the insertion direction D1, are the Y direction and go along the horizontal direction. Therefore, just moving the cartridge 4 horizontally suffices when the cartridge 4 is inserted into and removed from the cartridge mounting portion 6, resulting in improved operability of the cartridge 4. In particular, as in the present embodiment, the cartridge 4 having a large outer shape for accommodating a large amount of liquid can be inserted into and removed from the cartridge mounting portion 6 along the horizontal direction, and the operability of the cartridge 4 can thus be further improved. As described above, in the mounted state of the cartridge 4, the insertion direction D1 of the cartridge 4 and the extending direction of the liquid supply portion 442 intersect each other; accordingly, the insertion direction D1 can be set to the horizontal direction, and the extending direction can be set to a direction including a vertical direction component. Therefore, it is possible to reduce an amount of liquid that will be left in the liquid containing portion 450 without being consumed while improving the operability of the cartridge 4.

According to the above embodiment, as illustrated in FIGS. 11 and 19, the cartridge 4 includes the cartridge guide portions 447 and thus can be moved smoothly in the insertion direction D1. In particular, in the present embodiment, the outer shape of the cartridge 4 is the largest in the insertion direction D1. Since the cartridge 4 has the cartridge guide portions 447 to be guided in the insertion direction, it is possible to move the cartridge 4 more smoothly in the insertion direction D1. As illustrated in FIG. 19, the cartridge guide portions 447 include the first cartridge guide portion 447*a* formed on the first sidewall 45 and the second cartridge guide portion 447*b* formed on the second sidewall 46 corresponding to the first sidewall 45. Since this configuration makes it possible to provide the cartridge guide portions 447 on the respective sides of the cartridge 4 in the width direction, an insertion posture of the cartridge 4 will be stable when the cartridge 4 is moved in the direction of insertion into the cartridge mounting portion 6.

According to the above embodiment, as illustrated in FIG. 11, the circuit board 50 having the cartridge-side terminals 521 is disposed at the corner portion 89 where the front wall 42 and the bottom wall 44 intersect each other. This configuration enables easy contact between the cartridge-side terminals 521 and the apparatus-side terminals 721 by moving the cartridge 4 into the accommodation space 61 of the cartridge mounting portion 6 in the insertion direction. In particular, in the present embodiment, as illustrated in FIG. 14, the cartridge 4 has the terminal positioning portion 906 at the corner portion 89 and, therefore, the cartridge-side terminals 521 and the apparatus-side terminals 721 can be reliably brought into contact with each other in the mounting process.

According to the above embodiment, as illustrated in FIG. 12, the cartridge 4 has the liquid container 401 and the adapter 402, and a degree of freedom in design can thus be improved. For example, a common adapter 402 can be used for a plurality of liquid containers 401 and 401B whose liquid containing portions 450 have different capacities. Moreover, since the cartridge 4 has the liquid container 401 and the adapter 402, the liquid container 401 can be removed from the adapter 402 and a new liquid container 401 can be attached to the adapter 402, after the liquid has been consumed. This improves recyclability of the cartridge 4.

In the present embodiment, the adapter 402 that can be used in common for different types of liquid containers 401 and 401B is provided with the terminal positioning portions 906, the supply portion positioning portion 448, the cartridge-side identification member 430, and the cartridge engaging portion 497, which are elements configured to cooperate with the cartridge mounting portion 6. Therefore, even though the types of liquid containers 401 are different from each other, the same type of adapter 402 can be used, and a manufacturing cost of the cartridge 4 can thus be reduced. This makes it possible to simplify the structure of the liquid containers 401 and 401B.

According to the above embodiment, as illustrated in FIGS. 24 to 27, after the cartridge 4 is inserted into the accommodation space 61 through the insertion/removal opening 674, it is possible to couple the liquid inlet portion 642 and the liquid supply portion 442 to each other by putting the tip portion 642*b* of the liquid inlet portion 642 into the accommodation space 61 by displacement of the opening 614 toward the gravity-direction side around the rotation fulcrum 698. Therefore, in a process of inserting the cartridge 4 into the accommodation space 61, it is possible to prevent the cartridge 4 from colliding with the liquid inlet portion 642 formed in a direction intersecting the insertion direction D1.

B. Other Embodiments

B-1. Other Embodiment 1

In the above embodiment, as illustrated in FIG. 23, the insertion direction D1 is parallel to the horizontal direction, but is not limited thereto. In another embodiment, the insertion direction D1 may be inclined with respect to the horizontal direction as long as it has a horizontal direction component. For example, the insertion direction D1 may be inclined with respect to the horizontal direction within a range of greater than 0° to not greater than 15°. In the above embodiment, in the mounted state of the cartridge 4, the central axis CA2 of the liquid supply portion 442 is inclined with respect to the gravity direction. However, its direction may be along the gravity direction.

B-2. Other Embodiment 2

In the above embodiment, as illustrated in FIGS. 25 to 27, the liquid supply portion 442 and the liquid inlet portion 642 are coupled to each other by rotational movement of the cartridge 4 around the rotation fulcrum 698 in the coupling direction D2, but is not limited thereto. For example, the liquid supply portion 442 and the liquid inlet portion 642 may be coupled to each other by moving the cartridge 4 in the −Z direction by moving the entire support member 610 in the −Z direction. That is, in the terminal connection process, the support member 610 may move in the −Z direction, which is the gravity direction, to displace the opening 614 in the −Z direction, which is the gravity direction, thereby putting the tip portion 642*b* of the liquid inlet portion 642 into the accommodation space 61 through the opening 614. Alternatively, the position of the support member 610 may be fixed, and the liquid inlet portion 642 may move to be coupled to the liquid supply portion 442.

B-3. Other Embodiment 3

In the above embodiment, as illustrated in FIG. 12, the liquid container 401 and the adapter 402 are separate bodies, but may be integrated with each other.

B-4. Other Embodiment 4

The present disclosure is not limited to an ink-jet printer and an ink cartridge thereof, but can also be applied to any printing apparatus that ejects a liquid other than ink, and a cartridge thereof. For example, the present disclosure can be applied to the following various printing apparatuses and cartridges thereof.

(1) Image recording apparatus such as a facsimile apparatus or the like;

(2) Printing apparatus configured to eject a colorant used in color filter production for an image display device such as a liquid crystal display or the like;

(3) Printing apparatus configured to eject an electrode material used for forming electrodes of an organic EL (Electro Luminescence) display, a surface-emitting display (Field Emission Display, FED), or the like;

(4) Printing apparatus configured to eject a liquid containing a living organic material used in biochip fabrication;

(5) Sample printing apparatus as a precision pipette;

(6) Lubricating oil printing apparatus;

(7) Liquid resin printing apparatus;

(8) Printing apparatus configured to eject, with pinpoint accuracy, lubricating oil onto a precision device such as a watch, a camera, or the like;

(9) Printing apparatus configured to eject transparent liquid resin such as ultraviolet ray curing resin onto a substrate so as to form a micro hemispherical lens (optical lens) used in an optical communication element or the like;

(10) Printing apparatus configured to eject an acid etchant or an alkaline etchant for etching a substrate or the like;

(11) Printing apparatus equipped with a liquid ejecting head for ejecting any other micro droplets.

The term "liquid droplet" refers to a state of liquid ejected from a printing apparatus and encompasses a particulate droplet, a tear-shaped droplet, and a droplet that forms a thready tail. In addition, the "liquid" mentioned here may be any material that can be ejected by the printing apparatus. For example, the "liquid" may be a material in a state when a substance is in a liquid phase, and materials in a liquid state in which viscosity is high or low and materials in a liquid state such as sol, gel water, other inorganic solvents, organic solvents, solutions, liquid resins, and liquid metals are also included in the "liquid". In addition, not only a liquid as one state of a substance, but also a liquid in which particles of a functional material formed of a solid substance such as a pigment or a metal particle are dissolved, dispersed, or mixed in a solvent are included in the "liquid". In addition, typical examples of the liquid can include the ink as described in the above embodiment, liquid crystal, or the like. Here, the ink includes general water-based inks, oil-based inks, and various liquid compositions such as gel inks and hot melt inks.

C. Other Aspects

The present disclosure is not limited to the above-described embodiment, and can be realized by various configurations without deviating from the spirit thereof. For example, technical features of an embodiment corresponding to technical features in each of aspects described below can be appropriately replaced or combined in order to solve some or all of the problems described above or achieve some or all of the effects described above. In addition, the technical feature may be deleted unless it is described as essential in the present specification.

(1) According to a first aspect of the present disclosure, there is provided a cartridge configured to be mounted into a cartridge mounting portion of a printing apparatus having a liquid inlet portion configured to receive a liquid. The cartridge includes a liquid containing portion that contains the liquid; a front wall that is located on an insertion-direction side, an insertion direction being a direction of being inserted into the cartridge mounting portion; and a bottom wall that intersects the front wall and in which a liquid supply portion configured to be coupled to the liquid inlet portion is disposed. According to this aspect, since the liquid supply portion is disposed in the bottom wall intersecting the front wall located on the insertion-direction side, the liquid in the liquid containing portion is able to flow smoothly to the liquid supply portion. Therefore, it is possible to reduce an amount of liquid that will be left in the liquid containing portion without being consumed.

(2) In the above aspect, the liquid supply portion may extend in a direction intersecting the insertion direction. According to this aspect, since the cartridge is mounted in the cartridge mounting portion such that the direction in which the liquid supply portion extends includes a gravity direction component, the liquid in the liquid supply portion is able to flow smoothly. Therefore, it is possible to reduce an amount of liquid that will be left in the liquid containing portion without being consumed.

(3) In the above aspect, the cartridge may further include: a cartridge guide portion that extends in the insertion direction and is guided in the insertion direction by the cartridge mounting portion. According to this aspect, the cartridge is able to be moved smoothly in the insertion direction due to guiding of the cartridge guide portion.

(4) In the above aspect, the cartridge may further include: a first sidewall that intersects the front wall and the bottom wall; and a second sidewall that intersects the front wall and the bottom wall and faces the first sidewall, wherein the cartridge guide portion may include a first cartridge guide portion formed in the first sidewall, and a second cartridge guide portion formed in the second sidewall. According to this aspect, since the first cartridge guide portion is formed in the first sidewall, and the second cartridge guide portion is formed in the second sidewall corresponding to the first sidewall, the insertion posture of the cartridge will be stable when the cartridge is moved in the insertion direction.

(5) In the above aspect, the cartridge may further include: a corner portion where the front wall and the bottom wall intersect each other; and a cartridge-side terminal that is disposed on the corner portion and is capable of being electrically connected to an apparatus-side terminal which the cartridge mounting portion has. According to this aspect, it is possible to provide a cartridge that has a cartridge-side terminal that is capable of being electrically connected to an apparatus-side terminal.

(6) In the above aspect, the cartridge may further include: a liquid container that includes the liquid containing portion and the liquid supply portion; and an adapter that is attached to the liquid container and forms the bottom wall, wherein the adapter includes a supply portion disposing chamber in which the liquid supply portion is disposed, and an insertion opening through which the liquid inlet portion is inserted. According to this aspect, since the cartridge includes the liquid container and the adapter, a degree of freedom in design can be improved. For example, a common adapter can be used for a plurality of liquid containers whose liquid containing portions have different capacities.

(7) In the above aspect, the adapter may include the corner portion where the cartridge-side terminal is disposed. According to this aspect, since the adapter includes the corner portion, it is possible to dispose the cartridge-side terminal on the adapter.

(8) In the above aspect, the adapter may include the cartridge guide portion. According to this aspect, it is possible to dispose the cartridge guide portion on the adapter.

(9) According to a second aspect of the present disclosure, there is provided a printing system. The printing system includes: a printing apparatus that includes a cartridge mounting portion into which a cartridge is mounted and a liquid inlet portion configured to receive a liquid; and the cartridge of the above aspect. According to this aspect, since the liquid supply portion of the cartridge is disposed in the bottom wall intersecting the front wall located on the insertion-direction side, the liquid in the liquid containing portion is able to flow smoothly to the liquid supply portion. Therefore, it is possible to reduce an amount of liquid that will be left in the liquid containing portion without being consumed.

(10) In the above aspect, an insertion direction in which the cartridge is inserted into the cartridge mounting portion may intersect a direction in which the liquid supply portion of the cartridge extends. According to this aspect, since the insertion direction intersects the direction in which the liquid supply portion extends, it is possible to reduce an amount of liquid that will be left in the liquid containing portion without being consumed while improving the operability of the cartridge.

(11) According to a third aspect of the present disclosure, there is provided a printing apparatus. The printing apparatus includes: a cartridge mounting portion into which the cartridge of the above aspect is mounted, wherein the cartridge mounting portion includes an accommodation space into which the cartridge is inserted in an insertion direction and which accommodates the cartridge, and a liquid inlet portion that extends in a direction intersecting the insertion direction and is coupled to a liquid supply portion of the cartridge. According to this aspect, since the cartridge having the front wall located on the insertion-direction side and the bottom wall in which the liquid supply portion is disposed is mounted into the cartridge mounting portion, the liquid in the liquid containing portion is able to flow smoothly through the liquid supply portion toward the cartridge mounting portion. Therefore, it is possible to reduce an amount of liquid that will be left in the liquid containing portion without being consumed.

(12) In the above aspect, the cartridge mounting portion may further include a first apparatus wall that includes an insertion removal opening that is an entrance into, and an exit out of, the accommodation space, a second apparatus wall that faces the first apparatus wall, and a support member that forms an apparatus bottom wall including an opening and supports the cartridge, the apparatus bottom wall intersecting the first apparatus wall and the second apparatus wall, the liquid inlet portion may be located on an opposite side away from the accommodation space, with the support member interposed therebetween, and the cartridge mounting portion may further include a displacement mechanism that puts a tip portion of the liquid inlet portion into the accommodation space through the opening by letting the support member move to cause displacement of the opening toward a gravity-direction side. According to this aspect, it is possible to couple the liquid inlet portion and the liquid supply portion to each other by putting the tip portion of the liquid inlet portion into the accommodation space by causing displacement of the opening after inserting the cartridge into the accommodation space through the insertion removal opening. By this means, it is possible to improve operability of mounting the cartridge into the cartridge mounting portion.

Besides the above aspects, the present disclosure can be realized in an aspect of a method of manufacturing a cartridge, an aspect of a mechanism configured to mount a cartridge into a cartridge mounting portion, and the like.

REFERENCE SIGNS LIST

1 printing system
2 printing sheet
4, 4C, 4M, 4Y, 4K cartridge
4A first type of cartridge
4B second type of cartridge
6 cartridge mounting portion
8 cap member
10 printing apparatus
13 replacement cover
15 operation button
20 carriage
22 ejection head
24 tube
30 drive mechanism
31 control unit
32 timing belt
34 drive motor
41 main body
42 front wall
43 top wall
44 bottom wall
45 first sidewall
46 second sidewall
47 rear wall
50 circuit board
50*fa* front surface
61 accommodation space
61C, 61M, 61Y, and 61K slot
62 second apparatus wall
63 apparatus top wall
64 apparatus bottom wall
65 first apparatus sidewall
66 second apparatus sidewall
67 first apparatus wall
70 apparatus-side terminal portion
73 holding mechanism
89 corner portion
90 recess portion
401, 401B liquid container
402 adapter
402*e* end portion
430 cartridge-side identification member
431 container bottom wall
442 liquid supply portion
446 insertion opening
447 cartridge guide portion
447*a* first cartridge guide portion
447*b* second cartridge guide portion
448 supply portion positioning portion
449 internal flow passage
450 liquid containing portion
461 supply portion disposing chamber
497 cartridge engaging portion
521 cartridge-side terminal
525 storage device
602 apparatus guide portion
602*a* first apparatus guide portion
602*b* second apparatus guide portion
610 support member
611 first support sidewall
612 second support sidewall
613 main wall
614 opening
625 apparatus urging member
630 apparatus-side identification member
642 liquid inlet portion
642*a* base end portion
642*b* tip portion
644 apparatus-side supply portion positioning portion
644*a* one end portion
644*b* other end portion

674 insertion/removal opening
677 engagement forming body
697 mounting engaging portion
698 rotation fulcrum
699 liquid reservoir portion
721 apparatus-side terminal
722 terminal contact
739 connector
750 terminal holding portion
750*fa* holding portion surface
750*ft* first holding portion sidewall
750*fw* second holding portion sidewall
756 apparatus-side terminal positioning portion
756*t* first apparatus-side terminal positioning portion
756*w* second apparatus-side terminal positioning portion
780 urging member
782 attaching member
902 recess portion sidewall
902*t* first recess portion sidewall
902*w* second recess portion sidewall
906 terminal positioning portion
906*t* first terminal positioning portion
906*w* second terminal positioning portion
916 end wall
982 recess portion front wall
988 recess portion bottom wall
442*e*1 supply tip portion
442*e*2 supply base end portion
CA1, CA2 central axis
D1 insertion direction
D2 coupling direction
D3 uncoupling direction
Fa external force
Ft1 external force
MP middle portion
Rp terminal rotation fulcrum
RY external force

The invention claimed is:

1. A cartridge configured to be mounted into a cartridge mounting portion of a printing apparatus having a liquid inlet portion configured to receive a liquid, the cartridge comprising:
a liquid containing portion that contains the liquid;
a front wall that is located on an insertion-direction side, an insertion direction being a direction of being inserted into the cartridge mounting portion; and
a bottom wall that intersects the front wall and in which a liquid supply portion configured to be coupled to the liquid inlet portion is disposed, wherein
the cartridge further comprises:
a liquid container that includes the liquid containing portion and the liquid supply portion; and
an adapter that is attached to the liquid container and forms the bottom wall, wherein
the adapter includes
a supply portion disposing chamber in which the lkiquid supply portion is disposed, and
an insertion opening through hwich the liquid inlet portion is inserted, wherein
the adapter includes a corner portion where a cartridge-side terminal is disposed.

2. The cartridge according to claim 1, wherein
the liquid supply portion extends in a direction intersecting the insertion direction.

3. The cartridge according to claim 1, further comprising:
a cartridge guide portion that extends in the insertion direction and is guided in the insertion direction by the cartridge mounting portion.

4. The cartridge according to claim 3, further comprising:
a first sidewall that intersects the front wall and the bottom wall; and
a second sidewall that intersects the front wall and the bottom wall and faces the first sidewall, wherein
the cartridge guide portion includes
a first cartridge guide portion formed in the first sidewall, and
a second cartridge guide portion formed in the second sidewall.

5. The cartridge according to claim 3, further comprising:
a liquid container that includes the liquid containing portion and the liquid supply portion; and
an adapter that is attached to the liquid container and forms the bottom wall, wherein
the adapter includes
a supply portion disposing chamber in which the liquid supply portion is disposed,
an insertion opening through which the liquid inlet portion is inserted,
wherein the adapter includes the cartridge guide portion.

6. The cartridge according to claim 1, further comprising:
a corner portion where the front wall and the bottom wall intersect each other; and
a cartridge-side terminal that is disposed on the corner portion and is capable of being electrically connected to an apparatus-side terminal which the cartridge mounting portion has.

7. A printing system, comprising:
a printing apparatus that includes a cartridge mounting portion into which a cartridge is mounted; and
the cartridge according to claim 1.

8. The printing system according to claim 7, wherein
an insertion direction in which the cartridge is inserted into the cartridge mounting portion intersects a direction in which the liquid supply portion of the cartridge extends.

9. A printing apparatus, comprising:
a cartridge mounting portion into which a cartridge is mounted, wherein
the cartridge comprises:
a liquid containing portion that contains the liquid;
a front wall that is located on an insertion-direction side, an insertion direction being a direction of being inserted into the cartridge mounting portion; and
a bottom wall that intersects the front wall and in which a liquid supply portion configured to be coupled to the liquid inlet portion is disposed, wherein
the cartridge mounting portion includes
an accommodation space into which the cartridge is inserted in an insertion direction and which accommodates the cartridge, and
a liquid inlet portion that extends in a direction intersecting the insertion direction and is coupled to a liquid supply portion of the cartridge, wherein
the cartridge mounting portion further includes
a first apparatus wall that includes an insertion removal opening that is an entrance into, and an exit out of, the accommodation space,
a second apparatus wall that faces the first apparatus wall, and
a support member that forms an apparatus bottom wall including an opening and supports the cartridge, the apparatus bottom wall intersecting the first apparatus wall and the second apparatus wall, and the liquid inlet portion is located on an opposite side away from the accommodation space, with the support member interposed therebetween, and the cartridge mounting portion further includes a displacement mechanism that puts a tip portion of the liquid inlet portion into the accommodation space through the opening by letting the support member move to cause displacement of the opening toward a gravity-direction side.

10. A cartridge configured to be mounted into a cartridge mounting portion of a printing apparatus having a liquid inlet portion configured to receive a liquid, the cartridge comprising:

a liquid containing portion that contains the liquid;

a front wall that is located on an insertion-direction side, an insertion direction being a direction of being inserted into the cartridge mounting portion; and a bottom wall that intersects the front wall and in which a liquid supply portion configured to be coupled to the liquid inlet portion is disposed, wherein the cartridge further comprising:

a liquid container that includes the liquid containing portion and the liquid supply portion; and an adapter that is attached to the liquid container and forms the bottom wall, wherein the adapter includes a supply portion disposing chamber in which the liquid supply portion is disposed, and an insertion opening through which the liquid inlet portion is inserted.

* * * * *